(12) United States Patent
Karr

(10) Patent No.: US 7,791,470 B2
(45) Date of Patent: Sep. 7, 2010

(54) SPIN AROUND DIRECTION AND DISTANCE LOCATOR

(75) Inventor: Lawrence J. Karr, Santa Monica, CA (US)

(73) Assignee: RoundTrip LLC, Los Angeles, CA (US)

( * ) Notice: Subject to any disclaimer, the term of this patent is extended or adjusted under 35 U.S.C. 154(b) by 869 days.

(21) Appl. No.: 11/677,578

(22) Filed: Feb. 21, 2007

(65) Prior Publication Data

US 2007/0194923 A1    Aug. 23, 2007

Related U.S. Application Data

(60) Provisional application No. 60/775,148, filed on Feb. 21, 2006.

(51) Int. Cl.
| G08B 1/08 | (2006.01) |
| G08B 5/22 | (2006.01) |
| H04Q 5/22 | (2006.01) |
| B60R 25/10 | (2006.01) |
| G01C 21/00 | (2006.01) |

(52) U.S. Cl. ............... 340/539.13; 340/10.5; 340/10.1; 340/426.22; 340/825.36; 340/825.49; 340/572.1; 701/207

(58) Field of Classification Search ........................ None
See application file for complete search history.

(56) References Cited

U.S. PATENT DOCUMENTS

| 4,006,477 | A | 2/1977 | Yost, Jr. et al. | 343/6.8 |
|---|---|---|---|---|
| 4,047,171 | A | 9/1977 | Fugit | 343/6.8 |
| 4,156,873 | A | 5/1979 | Moore | 343/6.8 |
| 4,218,680 | A | 8/1980 | Kennedy | 343/6.8 |
| 4,468,656 | A | 8/1984 | Clifford et al. | 340/539 |
| 4,475,106 | A | 10/1984 | Andrews | 343/435 |
| 4,608,022 | A | 8/1986 | Bellofatto | 434/243 |
| 4,954,835 | A | 9/1990 | Lanciaux | 342/418 |
| 5,075,694 | A | 12/1991 | Donnangelo et al. | 342/455 |
| 5,280,293 | A | 1/1994 | Tong | 342/417 |
| 5,448,248 | A | 9/1995 | Anttila | 342/400 |
| 5,515,062 | A | 5/1996 | Maine et al. | 342/457 |
| 5,515,419 | A | 5/1996 | Sheffer | 379/58 |
| 5,572,427 | A | 11/1996 | Link et al. | 364/443 |
| 5,574,467 | A | 11/1996 | Saunders | 342/398 |
| 5,613,193 | A | 3/1997 | Ishikawa et al. | 455/12.1 |
| 5,632,217 | A | 5/1997 | Ford et al. | 114/150 |
| 5,905,464 | A * | 5/1999 | Lanciaux | 342/443 |

(Continued)

*Primary Examiner*—Daniel Wu
*Assistant Examiner*—Fekadeselassie Girma
(74) *Attorney, Agent, or Firm*—Merchant & Gould, P.C.

(57) ABSTRACT

A hand-held remote locator (RL) device is used to locate a transponder or micro-transponder (MT). The user activates the RL to transmit a multi-frame ping to the MT in a slow ping mode, where the MT transmits reply messages when the multi-frame ping is received The RL calculates a distance between the RL and the MT using the time-of-flight (TOF) between the transmission of a ping and the receipt of a reply. The user can then engage a fast ping mode, where the RL transmits the multi-frame ping at an increased rate. The user then extends the RL device away from their body and turns through at least a partial arc length about their center line such that data is collected including compass readings, Doppler information, and distance calculations. The directional location for the MT is determined by the RL using the collected data.

42 Claims, 23 Drawing Sheets

U.S. PATENT DOCUMENTS

| | | | |
|---|---|---|---|
| 5,943,013 A | 8/1999 | Ohashi | 342/417 |
| 6,177,907 B1 * | 1/2001 | Golovin et al. | 342/458 |
| 6,268,829 B1 * | 7/2001 | Weckstrom | 342/418 |
| 6,317,049 B1 | 11/2001 | Toubia et al. | 340/573.4 |
| 6,337,665 B1 | 1/2002 | Gaukel | 343/765 |
| 6,362,778 B2 | 3/2002 | Neher | 342/357.07 |
| 6,437,742 B1 | 8/2002 | Niesen et al. | 342/418 |
| 6,466,162 B2 | 10/2002 | Boman | 342/357.08 |
| 6,608,592 B2 | 8/2003 | McReynolds | 342/418 |
| 6,611,757 B2 | 8/2003 | Brodie | 701/213 |
| 6,646,617 B1 | 11/2003 | Gaukel | 343/765 |
| 6,778,130 B1 | 8/2004 | Bevan et al. | 342/174 |
| 6,801,782 B2 | 10/2004 | McCrady et al. | 455/517 |
| 6,826,472 B1 | 11/2004 | Kamei et al. | 701/202 |
| 6,876,878 B2 | 4/2005 | Zhdanov | 600/407 |
| 6,914,559 B2 | 7/2005 | Marks | 342/428 |
| 7,592,918 B2 * | 9/2009 | Karr | 340/572.1 |
| 2005/0012653 A1 * | 1/2005 | Heide et al. | 342/42 |

* cited by examiner

SPIN AROUND DIRECTION AND DISTANCE LOCATOR

RELATED APPLICATION

This utility patent application claims the benefit under 35 United States Code §119(e) of U.S. Provisional Patent Application No. 60/775,148, which was filed Feb. 21, 2006.

FIELD OF THE INVENTION

The present disclosure relates generally to a system and method for locating a transponder with a remote locator. More particularly, the present disclosure relates to a remote locator that includes a compass sensor that is arranged to assist in locating a transponder with the use of a spin-around procedure.

BACKGROUND

Some methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources. The presently described invention identifies various noise problems from the conventional solutions and provides a new and novel system, method, and apparatus that is arranged to extract signals from a transmission using very low power in a small scale object location system.

BRIEF DESCRIPTION OF THE DRAWINGS

Non-limiting and non-exhaustive embodiments are described with reference to the following drawings.

DETAILED DESCRIPTION

Figure 1A:
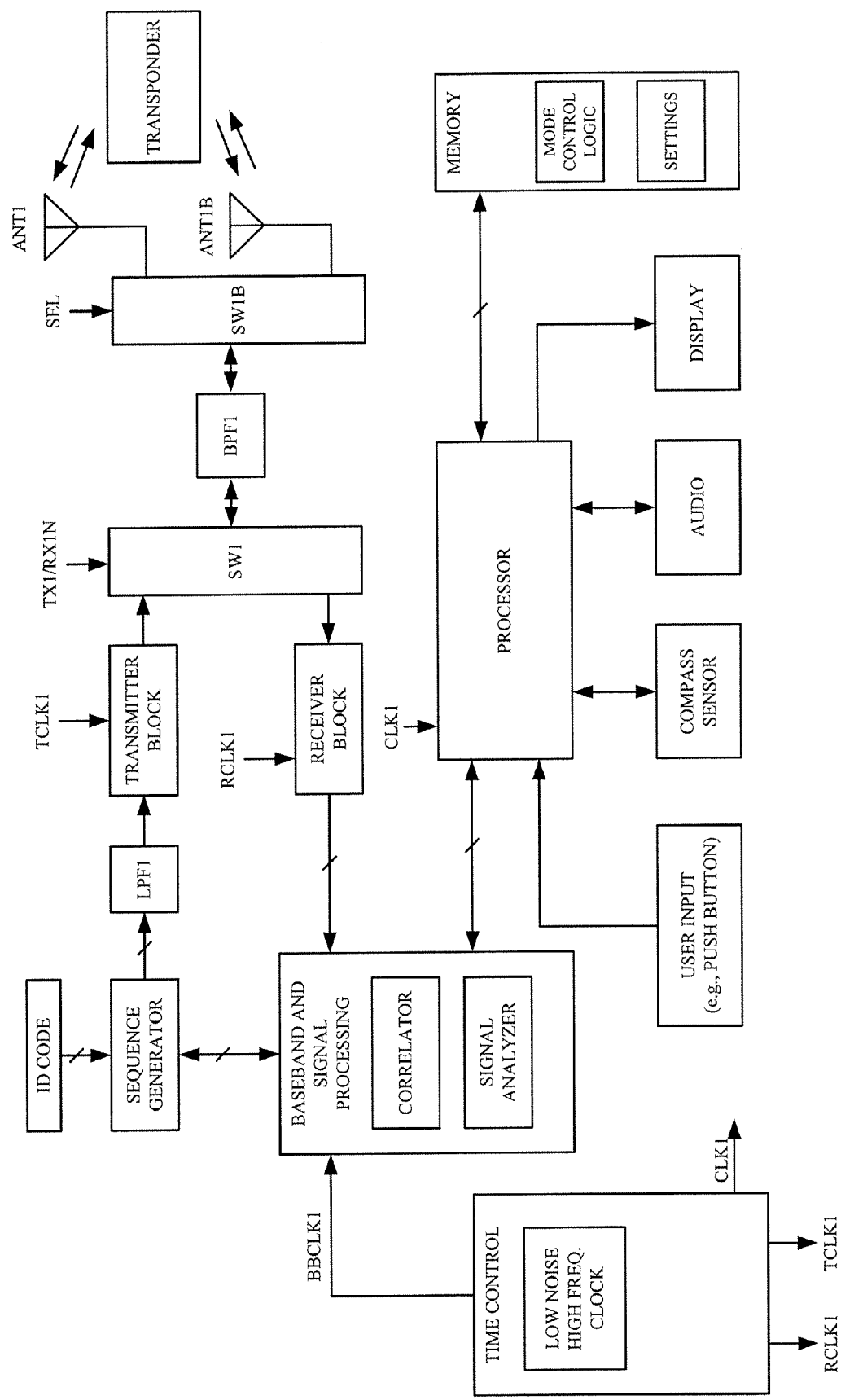
FIGS. 1A and 1B illustrate an example communication system that includes a remote locator (RL) and a micro-transponder (MT)

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure relates to a system, method, and apparatus for determining the location of a transponder or micro-transponder (MT) device from a hand-held remote locator (RL) device. The RL is arranged to transmit a multi-frame ping to the MT in a slow ping mode when initiated by a user. The MT is arranged to receive the multi-frame ping, and transmit a reply message to the RL. The RL is arranged to calculate a distance between the RL and the MT using the time-of-flight (TOF) between the transmission of a ping and the receipt of a reply. The user can subsequently instruct the RL and the MT to enter a fast ping mode, where the RL transmits the multi-frame ping at an increased rate. The RL includes a compass device. During the fast ping mode, the user extends the RL device away from their body and turns through at least a partial arc length about their center line such that a series of data is collected including compass readings, Doppler information, and distance calculations.

The RL subsequently determines a directional location for the MT and can provide a distance and directional readout for the user.

As will be described, the MT and the RL each include a receiver and a transmitter. The communication signals from the transmitters are encoded with a unique ID code. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information. The MT can be a wearable circuit such as a band or collar, affixed to an object, embedded in an object, or an implantable bionic device.

Frequency and phase information in the MT is initially recovered from one portion of the transmission from the RL, and further refined using a bootstrapping process. Timing location within the frame (e.g., coarse timing) is recovered in another portion of the transmission from the RL. After the timing, phase and frequency are recovered, data reception can be scheduled with a degree of certainty. The data is extracted and a reply message is transmitted from the MT back to the RL, where similar signal processing functions are performed. The carefully corrected round-trip time of the transmission sequence is used to identify distance between the RL and the MT. A synthetic round-trip Doppler shift, which is independent of the MT's internal clock, is measured to and correlated against the relative motion of the RL and MT to assess the magnitude of a directional vector between the RL to the MT.

The presently described system has the ability to identify location of a MT with a RL utilizing an asymmetric transmission system. The signals captured by the MT will typically not be aligned in time with the start and end of a complete pattern in the sequence (e.g., a 2047 chip sequence). However, the RL is arranged to transmit repeated patterns over time in the sequence. The MT is arranged to cyclically capture a complete pattern in the sequence, even though the captured pattern may be rotated in time relative to the start and end of a complete pattern. A circular correlator can be used to evaluate the captured signals such that the captured signals are properly identified by the MT, despite the rotation status of the pattern. Since the MT does not have a priori knowledge of the timing related to transmission and reception from the RL, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the RL is arranged to utilize an integration and circular correlation technique to increase the signal-to-noise level of the captured reply transmission.

In the presently described system, a reply transmission signal is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over several tens of transmission sequences is much less than one turn (one phase rotation through 360 degrees). This allows the RL to sample the reply transmission and add (or integrate), either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

Example System

Figure 1B:
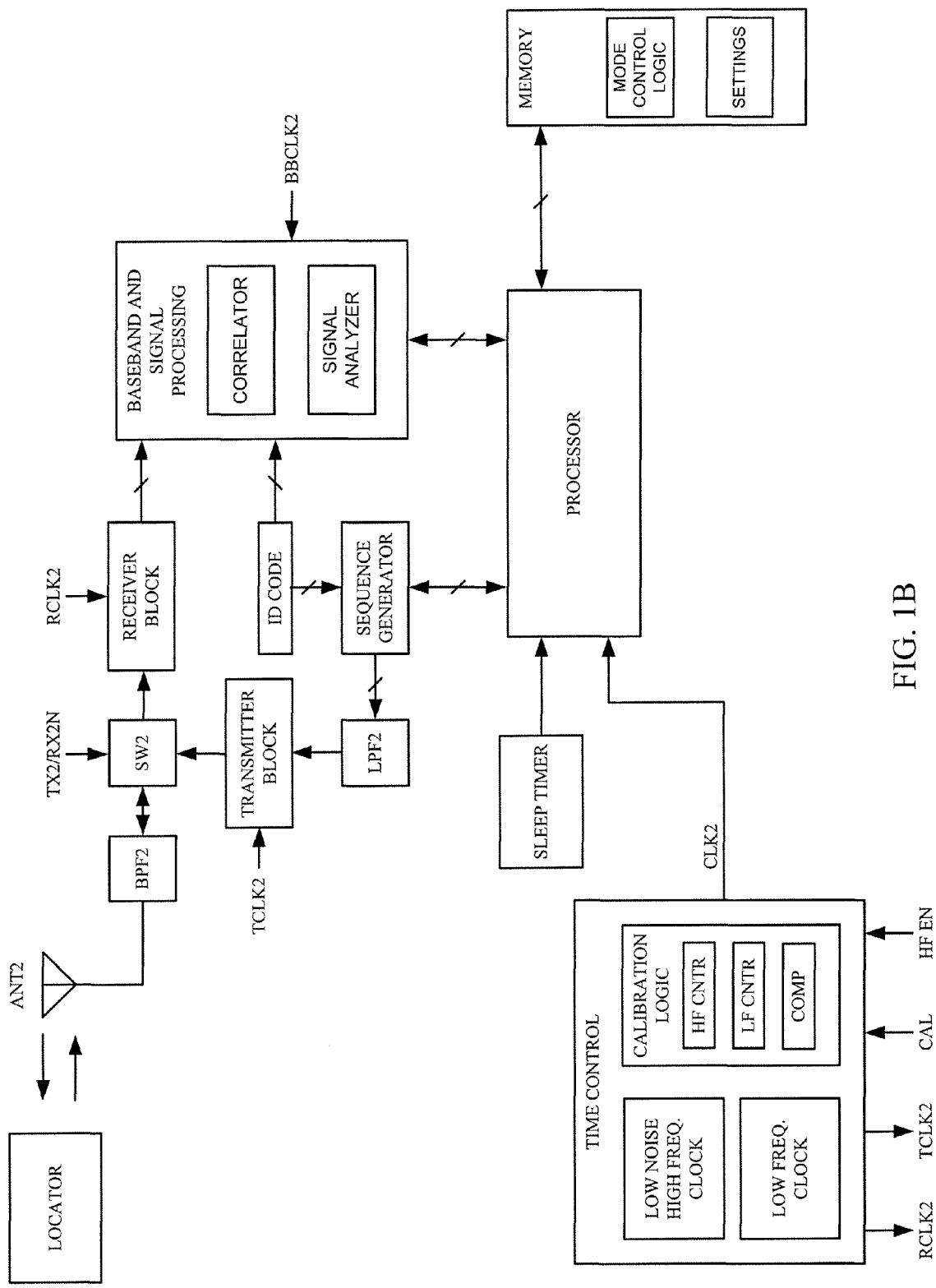

FIGS. 1A and 1B illustrate an example communication system that includes a RL and a MT arranged in according with at least one aspect of the present disclosure. The RL is arranged to transmit a sequence over a communication channel, while the MT is arranged to transmit back to the RL over the communication channel in a half-duplex fashion.

The example RL device includes a first antenna (ANT1) that is coupled to a first transmit/receive switch (SW1). The first transmit/receive switch (SW1) is coupled to a first transmitter block and a first receiver block in response to a first control signal (TX1/RX1N). A transmission sequence (e.g., TSEQ) is coupled to the first transmitter block when transmission commences, where the sequence is determined by an ID code. The first receiver block is coupled to the baseband and signal processing block. Time control is provided to the transmitter, receiver, baseband processing, and the processor in the form of various control signals (CLK1, RCLK1, TCLK1 and BBCLK1). The processor receives inputs and coordinates the operation of the baseband processing, signal analysis, memory buffering, input processing, display processing, and audio processing. The memory processing can include random access memory (RAM), read-only memory (ROM), as well as non-volatile memory (NVM) such as Flash memory, battery backed up RAM, EEPROM, as well as other NVM type technologies.

Additional antennas (e.g., ANT1B) can also be coupled to the receiver block of the RL device such as through an additional switch (SW1B). The selection of the antenna can be accomplished by a select control signal (SEL) that is arranged to operate the additional switch (SW1B) as a multiplexer between the various antennas. The various antennas can be arranged (e.g., orthogonal to one another) as diversity antennas that are used to gain additional information about signal strength, distance and Doppler, etc.

The example MT device includes a second antenna (ANT2) that is coupled to a second transmit/receive switch (SW2). The second transmit/receive switch (SW2) is coupled to a second transmitter block and a fourth receiver block in response to another control signal (TX2/RX2N). A reply sequence (e.g., RSEQ) is coupled to the second transmitter block when transmission commences, where the sequence is determined by the ID code. The second receiver block is arranged to provide in-phase and quadrature signals (I and Q) that are captured in a buffer (e.g., a memory buffer such as a digital buffer or an analog sample buffer). The capture buffer is coupled to a correlator in a baseband signal processor block, which can provide both direct form correlation and FFT correlation functions. The FFT correlator is arranged to provide a circular correlation function of the received I/Q data with the complex I/Q data related to the ID code. A signal analyzer and a processor are both arranged to receive the data output from the correlator for evaluation. Time control is provided to the transmitter, receiver, and the processor in the form of various additional control signals (TCLK2, RCLK2 and CLK2). The processor receives inputs and coordinates the operation of the correlator, signal analysis, sequence generation, memory buffering, and other related tasks. The memory for the processor can include random access memory (RAM), read-only memory (ROM), as well as non-volatile memory (NVM) such as Flash memory, battery backed up RAM, EEPROM, as well as other NVM type technologies.

Current technology systems for locating people and things have a rather short battery life, which can limit their use. The present disclosure describes a small device (e.g., a transponder or a micro-transponder) that has a long battery life by suspending energy consumption until operation is required. Since the MT device needs to be in an active state for very brief intervals, the battery life is extended substantially. Although cellular telephone technologies can be used to determine position in conjunction with a global positioning system (GPS) set, the energy required to operate conventional cellular telephones even in a standby mode will rapidly deplete small batteries. In addition, a GPS set in such an application would awaken from sleep, and perform a cold start location fix, which process will consume a considerable amount of energy that again rapidly depletes the battery. The present disclosure contemplates that a portable location technology is preferably operated intermittently to minimize power consumption, and thus addresses some of the problems from conventional location determination techniques.

The present disclosure has analyzed and identified problems with current Doppler shift technology such as found in GPS signals. Although GPS signals may be detected efficiently by means of FFT correlation, there are approximately 28 GPS satellites that include a significant level of Doppler ambiguity from about +15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

Example Remote Locator (RL)

FIG. 1A illustrates an example RL that is arranged to communicate with an example MT. The MT is arranged (e.g., by a sleep timer) to wake up at pre-determined intervals and receive a coded transmission signal (e.g., COM13). The coded signals are received and evaluated using a variety of signal processing methods such as digital signal processing, analog signal processing, Fast Fourier Transform (FFT), correlation, inverse FFT (IFFT) to name a few. The MT evaluates the received coded signals to determine if the signals are specifically identified with the MT (e.g., by a unique ID code). Through the various signal-processing functions, various internal signals and parameters are varied such that time, frequency and phase alignments for receiving and transmitting coded information are successively refined (e.g., through digital control mechanisms) for accurate processing. The MT, using as its time base the Doppler shifted frequency of the signal from the RL, subsequently transmits a reply sequence back to the RL, which is similarly coded. The RL receives the coded transmission, and processes the incoming signals in a similar fashion as the MT.

The RL includes a processor that can be any appropriate processing means including but not limited to at least one: micro-processor, micro-controller, CISC processor, RISC processor, application specific integrated circuit (ASIC), to name a few. The processor is arranged to: receive and evaluate inputs, control outputs, log data, retrieve logged data, and execute programs. The processor is thus arranged to communicate with any number of circuit components such as: a time control circuit, an input circuit, a display output circuit, an audio output or input circuit, a storage circuit, and a memory circuit.

Example inputs can be from any number of input devices (or user input means) such as: an interrupt signal, a wake-up timer, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. In some examples, sound can be used as an input to the RL via audio input processor such as an analog-to-digital converter (ADC) circuit or a coder-decoder (CODEC) circuit that includes analog-to-digital conversion means. A microphone can be built into the RL or externally coupled to the RL through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the RL. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the RL device, as well as to provide navigation and location information. The audio output circuit can include an audio output device and an audio output processor. The audio output processor is arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the RL to provide sound output. In another example, an audio output port such as a headphone jack can be provided in the RL for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the RL device, as well as to provide navigation and location information. Example display circuits can provide any appropriate video output such as, for example: an LED type display, an LCD type display, an active display, a passive display, a black and white display, a monochromatic display, and/or a color display. Other examples display circuits can be discrete arrangement of LEDS, seven segment displays, as well as other light emitting devices that can be used for reporting visual information. In some examples, the user interface can be integrated with the video output device such as, for example, a touch screen that is integrated with an LCD display. In other examples, the user input interface is separate from the video output device.

The processor in the RL of the present disclosure is arranged to cooperate with a compass sensor device or some similar means for determining a rotational position of the RL. The compass sensor can be an integrated circuit, a discrete circuit, or some other device that is arranged to provide compass sensor information that is related to a directional orientation of the RL. The compass sensor can be a digital compass device or an analog compass device that is arranged to work with an analog-to-digital converter, for example, to provide a comparable function.

In some examples, distance can be reported with display circuit in an alphanumeric representation (e.g., 100, 100', 100 ft, 100 m, etc.). In other examples, distance can be reported in a graphical representation such as an icon, a line, or other graphical shapes. Similarly, direction can be reported in either an alphanumeric representation (e.g., N, S, E, W, NE, SE, NW, or SW) or in a graphical representation. Any combination of graphical and alphanumeric representations can also be made.

The processor is arranged to apply mode control logic in response to a variety of user inputs for activating and deactivating a variety of operating modes as will be described. The mode control logic and any related settings for the RL can be provided in software form or as a firmware such as a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

The RL is operated to send a transmission that consists of a series of coded signals. The code is generated by a unique identifier (e.g., an ID Code) that is associated with a specific MT. A sequence generator is arranged to evaluate the unique identifier and create a transmit sequence. After the coded sequence is generated for the unique identifier, additional information is encoded into the transmit sequence. In one example, the additional information can be command/control instructions for the MT. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter block.

The transmitter block is arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method. The transmit-receive switch (SW1) is arranged to couple the carrier modulated coded signals to the antenna (ANT1) during the transmit sequence. A band-limiting filter (e.g., BPF1) can be provided between the antenna and the transmit-receive switch (SW1) such that out-of-band signals are ignored. The band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The RL is operated to receive a transmission from the MT that consists of another series of coded signals. The coded signal is similarly generated by the MT with a unique identifier (e.g., the ID Code) that is associated with the specific MT. The receiver block is arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antenna (ANT1) via SW1. The received signals are handled by a baseband processor that can also provide signal-processing functions. Alternatively, the baseband processor is arranged to provide captured signals to the processor, which is arranged to handle various signal-processing functions.

The described RL performs distance measurement by round trip time measurement. For example, the round trip time can be determined by the difference in time between the transmission of a signal from the MT to the RL, and the subsequent reply transmission of an acknowledgement signal from the RL back to the MT, offset by any other delays.

Bearing to the MT is determined by the operation of the RL in a search and locate mode as will be described later. In general, the user initiates a search mode to acquire a communication link and an initial distance calculation, followed by a user initiated locate mode that requires at least a partial rotation of the RL through an arc relative to the user where additional distance and correlator information is evaluated to determine direction.

Various timing signals that are employed by the RL are generated by a time control circuit as illustrated in FIG. 1A. The timing signals are used by the system to digitally synthesize transmitter and receiver carrier wave signals from a locally generated oscillator signal in the RL.

Example Micro-Transponder (MT)

FIG. 1B illustrates an example MT that is arranged to communicate with a RL. The example MT may be placed in a wristband, a collar, a watch, sewn into an article of clothing, or implanted in a patient such as a with a bionic-type device. The MT is arranged to receive a coded transmission signal, such as previously described, from the RL with a receiver block via switch SW2 and antenna ANT2. Optionally, a band-limiting filter (e.g., BPF2) can be used to minimize interference from out-of-band signals in the receiver and/or to prevent interference with other devices. The receiver demodulates the carrier frequency and provides I and Q information, which is subsequently captured by a capture buffer. The capture buffer provides output signals in the form of data to an FFT correlator, which correlates the decoded transmission with the unique identifier (ID code). The processor is arranged to cooperate with memory similar to that previously described for the RL.

Various processing methods are employed to perform base-band processing and signal analysis in the MT, including a correlator block and a signal analyzer block. The correlator block may include an FFT correlator and a direct-form correlator. The signal analyzer is arranged to evaluate the outputs from the FFT correlator and/or the direct form correlator, to determine if the received transmission sequence is identified with the specific MT. When the sequence is appropriately identified, various timing signals are adjusted such that the frequency and phase of the digitally synthesized transmitter and receiver signal(s) are precisely aligned in the MT. Information from the coded signals is extracted by the processor once the transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change to slow ping mode, change to fast ping mode, etc.

It is important to note that the processor in the MT of the present disclosure is arranged to apply mode control logic in response to signals that are received from the RL. The mode control logic an any related settings for the MT can be provided in any of the above described memory devices, or as hard-coded instructions in a micro-controller, to name a few. In another example, the processor and memory can be replaced with any other appropriate processor means such as a PLD, a specially designed circuit such as an ASIC, as well as others devices that are arranged to provide similar functionality.

A reply message is transmitted from the MT to the RL such that the RL can identify, locate, and receive data from the MT. The reply message is generated with a reply sequence generator that is keyed from the unique identifier (ID Code), similar to the transmit sequence generator. A low pass filter (e.g., LPF2) can be placed between the sequence generator and the transmitter block in the MT. The transmitter block is coupled to antenna ANT2 via switch SW2 to cause the coded reply transmission (e.g., COM31, COM32).

Since an example MT operates with limited energy, the MT is normally operated in a low power or sleep mode. The energy consumed in the sleep mode is sufficient to operate a sleep timer that operates from a low frequency clock. According to a pre-determined time interval, the MT is activated (e.g., wakeup is asserted by the sleep timer) and the MT looks for a signal to receive while operating a high frequency clock. When no identifiable signal can be received, the MT returns to the sleep mode, where the high frequency clock is disabled. The high frequency clock can be enabled and disabled by a respective control signal (e.g., HF EN).

Various timing signals that are employed by the MT (or MT) are generated by a time control circuit as illustrated in FIG. 1B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The time control circuit can include additional functionality to calibrate the high frequency clock with a calibration logic circuit. The calibration logic circuit can include any number of high frequency counters (HF CNTR), low frequency counters (LF CNTR), and digital comparator circuits (COMP), as well as other logic circuits such as registers, latches and related logic. In operation the calibration logic is enabled when a calibration signal (CAL) is asserted, such as in response to the processor when applying mode control logic.

The above described remote locator (RL) can be arranged to provide a relatively high power transmission signal (e.g., 1 Watt) over a long time interval (e.g., 2.5 seconds) to ensure that the MT has sufficient time to capture the necessary signals when it is active. The upper limit for energy that can be captured by the MT is determined by the radiated power from the RL multiplied times the capture time interval for the MT, multiplied times any loss factor due to the transmission path. An example transponder (MT) may be arranged to capture the signal from the RL for 157 μs, where the upper limit (ignoring path loss) for captured energy over the 157 μs time interval is approximately 157 μJules.

The MT can be arranged to transmit a very low power transmission signal (e.g., 10 mW) for a shorter time interval (e.g., 15.7 ms) than that for the RL (e.g., 2.5 s). The upper limit for energy that can be captured by the RL is determined by the radiated power from the MT multiplied times the capture time interval for the RL, multiplied times any loss factor due to the transmission path. For a 10 mW transmission over a 15.7 milli-second interval, the transmitted energy from the MT is approximately 157 μJules. The RL must be carefully arranged to capture signals form the MT such as by using an integration method as will be described later. It is contemplated that in one example embodiment, the MT will be implanted in a patient, and operated over at least several years using a watch-type battery.

The transponder (MT) is arranged to synthesize its own internal frequency for transmitting an acknowledgement signal by using the timing information that it acquires from the RL. The timing information that is received from the RL by the MT is Doppler shifted relative to the original transmission frequencies from the RL. The resulting synthesized frequency of the MT, while extremely accurate, corresponds to a Doppler shifted version of the original transmission frequencies form the RL. The acknowledgment signal from the MT is received by the RL, but is again Doppler shifted relative to the transmitting frequencies from the MT. The Doppler shift that result from the round trip of the signal transmissions (i.e., transmission from the RL to the MT, and reply transmission from the MT to the RL) is hereinafter referred to as the synthetic round-trip Doppler Shift.

Example Transmitter

Figure 2:
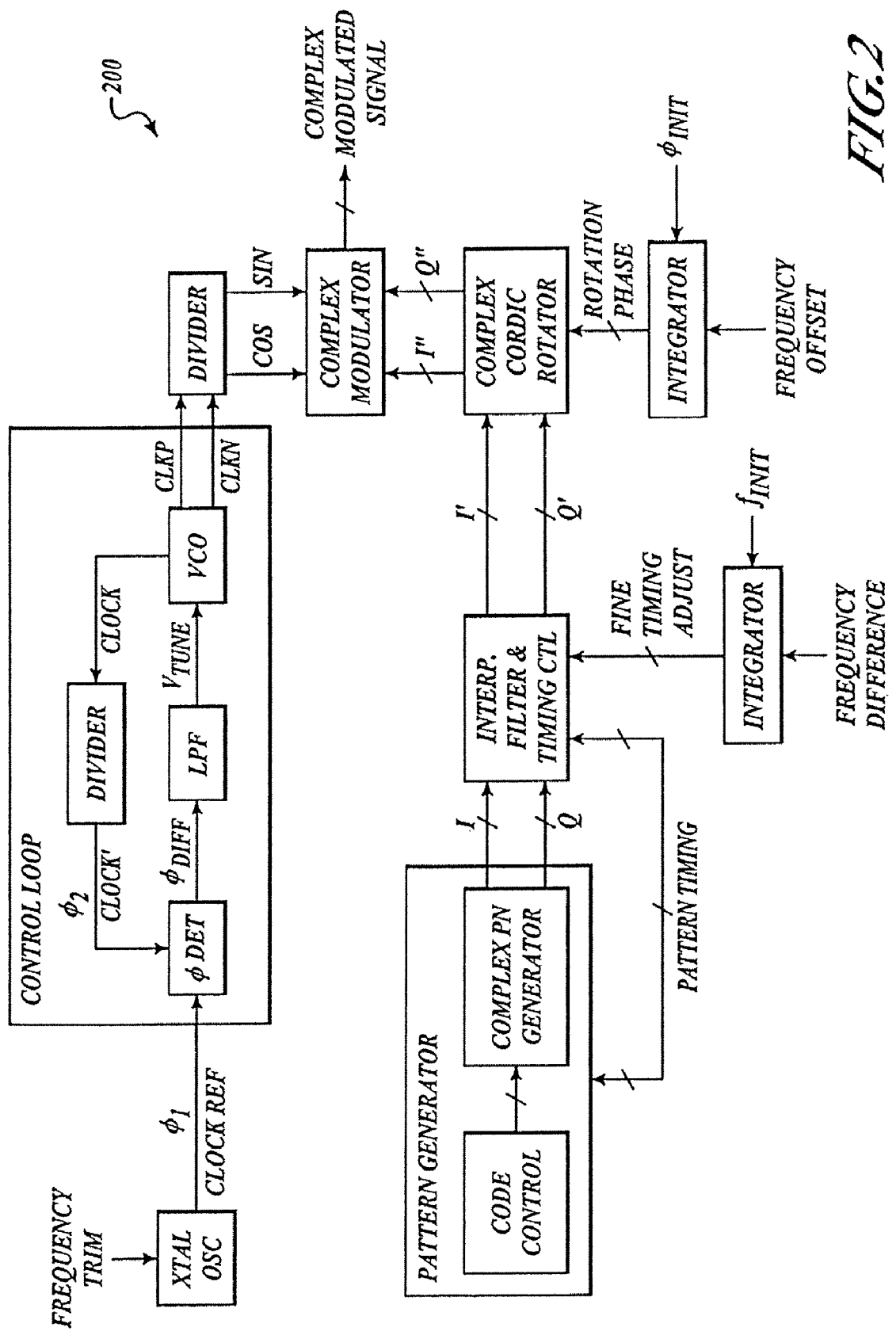
FIG. 2 illustrates an example transmitter.

FIG. 2 illustrates an example transmitter system. The transmitter system includes a crystal oscillator (XTAL OSC), a timing control circuit, a complex modulator, a pattern generator, an interpolation filter with timing control, integrators, and a complex cordic rotator.

The crystal oscillator is arranged to provide an oscillator signal as a clock signal (CLOCK) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., CLOCK$_{REF}$) is compared to a phase ($\phi_2$) from a feedback signal (e.g., CLOCK') by the phase detector to determine if the resulting clocks signal (CLOCK) is operating in phase with the reference clock (CLOCK$_{REF}$). The output of the phase detector corresponds to a phase difference signal ($\phi_{DIFF}$), which is provided to the low pass filter to generate a control voltage (VTUNE) for the VCO. The VCO adjusts the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHz) and COS(915 MHZ) or any other desired frequency.

The pattern generator includes a code control block and a pseudo-noise generator block. The code control block is arranged to provide the pre-determined patterns, keyed from an ID Code, for "A", "B", and "C" sequenced patterns as will be described later. The pseudo-noise generator generates complex numbers (e.g., I and Q) from the codes based on the timing signals (pattern timing) for sequencing the pattern. In one example, the pseudo noise generator block is arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust). The interpolator provides fine timing adjustment for the I and Q complex numbers (e.g., 8192/2047), and provides low-pass filtering for the transmitter. The integrator circuit can be initialized by an initialization parameter such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal is provided by another integrator that integrates the frequency offset. The integrator circuit can again be initialized by an initialization parameter such as $f_{INIT}$ and/or $\phi_{INIT}$. The output of the complex cordic rotator is a frequency shifted complex baseband signal (I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control is based on a unique identifier (ID Code). In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

Example Transmission Sequence

Figure 3:
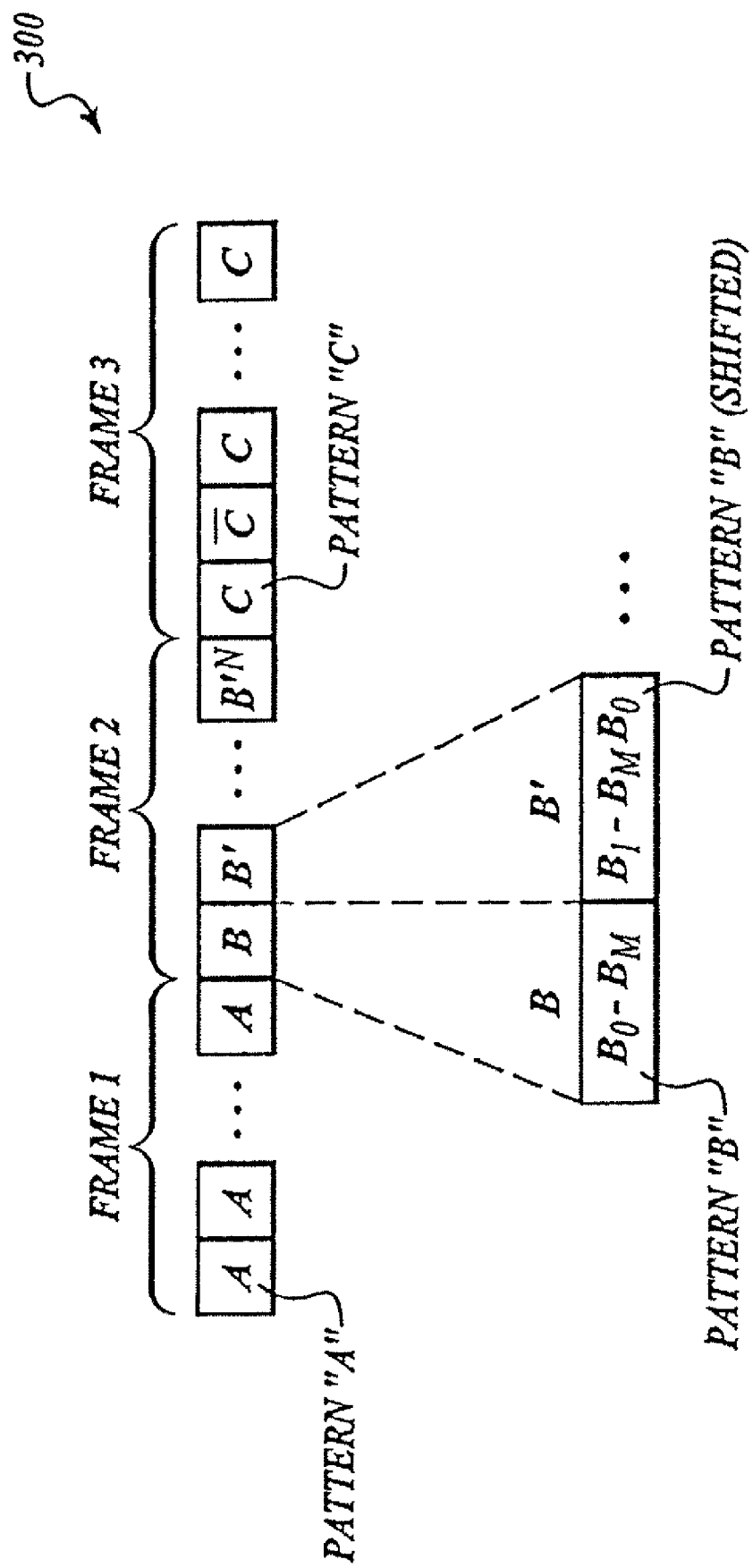
FIG. 3 is a diagram illustrating a set of frames formatted for transmission.

FIG. 3 is a diagram illustrating a set of frames formatted for transmission. A frame corresponds to a time-period for which a sequence is transmitted. For the example of FIG. 3, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission is referred to as a PING as will be described later.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1, . . . , BM, while the second B sequence (B') includes coded bauds B1, B2, . . . , BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, ½ baud, 2¼ baud, etc.), or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

The MT transmits sequences A and B in substantially the same format as that described above. However, since the RL initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc.

The timing and carrier signals for transmission in the MT are derived from the RL's clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information:
Received Frame consists of 4096 samples, 2047 baud;
Received Sample Rate is 25.777M complex samples/sec;
Transmitted Sample Rate is 2*25.777M complex samples/sec;
Baud Rate is determined by Sample Rate*(2047/2048)/2=12.8822
Mbaud symbols/sec, QPSK; and
Frame Period is 158.98 μs.
An example system has the following RL TX parameters:
"A" sequence is 2.2263 seconds long, (13×1024 frames), repeated un-shifted with one of 2047 first address portions;
"B" sequence is 317.96 ms long (2000 frames), repeated shifted with one of 2047 second address portions; and
"C" sequence is 10.174 ms long (64 frames), repeated un-shifted with one of 2047 third address portions, frames inverted according to modulated data.
An example system has the following MT TX parameters:
"A" sequence is 81.397 ms long, (512 frames);
"B" sequence is 20.349 ms long (128 frames); and
"C" sequence is 10.174 ms long (64 frames), repeated un-shifted with one of 2047 third address portions, frames inverted according to modulated data.

Example Timing Acquisition Sequence

Figure 4A:
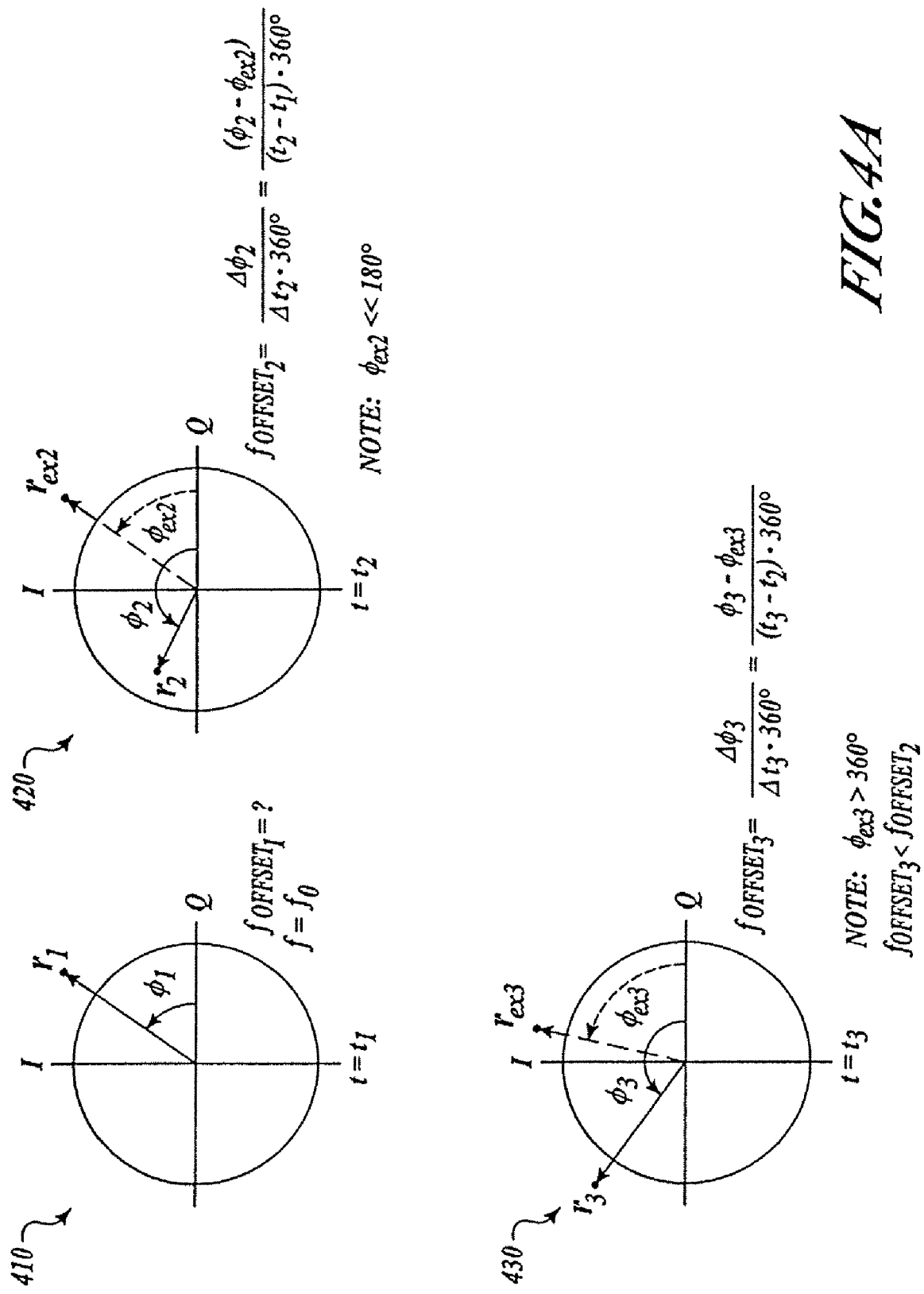
FIGS. 4A and 4B are diagrams illustrating the timing acquisition for an example communication system.
Figure 4B:
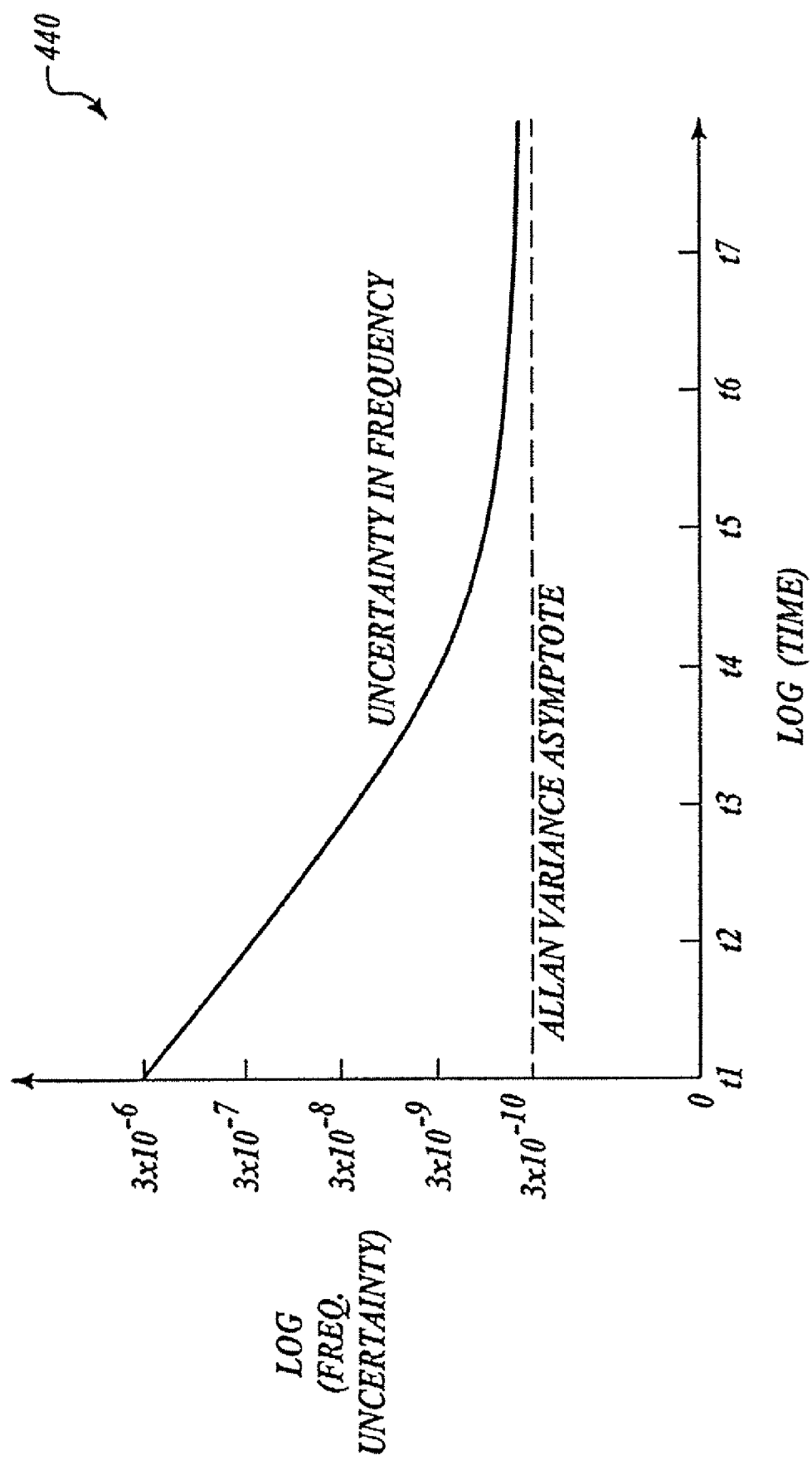

FIGS. 4A and 4B are diagrams illustrating the timing acquisition for an example communication system. The described timing acquisition sequence may be employed by the MT when receiving the three-part transmission sequence described previously with respect to FIGS. 1A, 1B, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 4A illustrates examples of phase and frequency determinations associated with an example "pattern A" sequence, while FIG. 4B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as (P2, and calculate a frequency offset error associated with the difference between the expected receiver frequency and the actual carrier wave from the RL's transmission. The frequency offset ($f_{offset2}$) is determined by the difference in the phases and the elapsed time between transmissions as: $f_{offset2}=[\phi_2-\phi_{ex2}]/[360(t_2-t_1)]$, where $\phi_{ex2}$ corresponds to the expected phase at time $t_2$. It is important to note that the time between the first two measurements should be short enough to result in an expected relative phase difference of substantially less than 180 degrees to ensure that unresolveable ambiguities do not occur. Notice that the expected phase for this time corresponds to $\phi_1$.

At time $t=t_3$, another portion of the transmission of pattern A is received, and the MT is arranged to measure the phase as (P3, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f_{offset2}=[\phi_3-\phi_{ex3}]/[360(t_3-t_2)]$, where $\phi_{ex3}$ corresponds to the expected phase at time $t_3$. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 4B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the RL. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 5A:
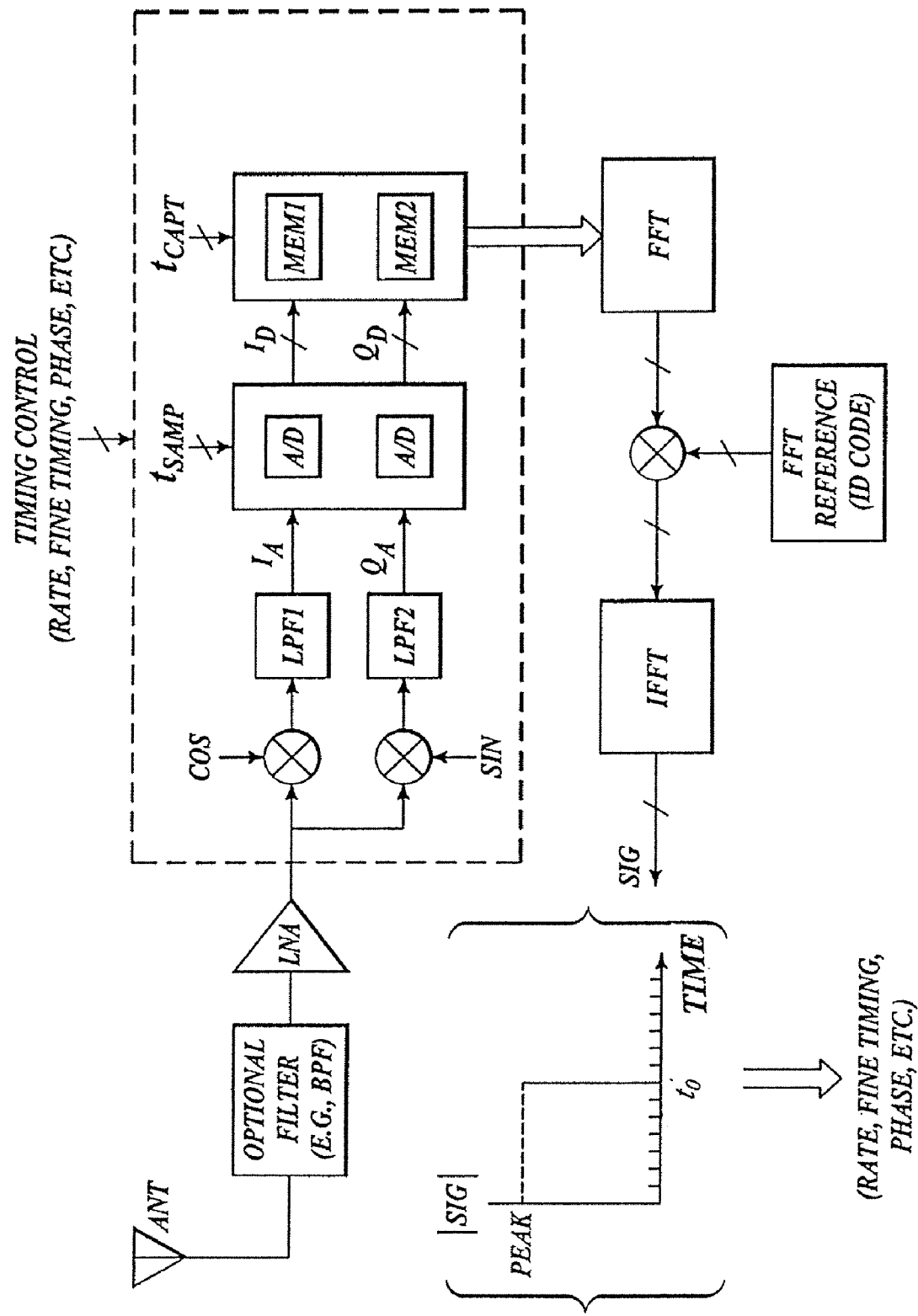
FIGS. 5A-5B are example diagrams for example receivers.

FIG. 5A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor. Other example receivers can use an analog storage method and perform a delayed A/D conversion.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal to the frequency domain. The FFT of the reference signal is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output will peak when a valid received code is identified in the signal. The carrier phase and pattern timing are also extracted from the received signals.

Figure 5B:
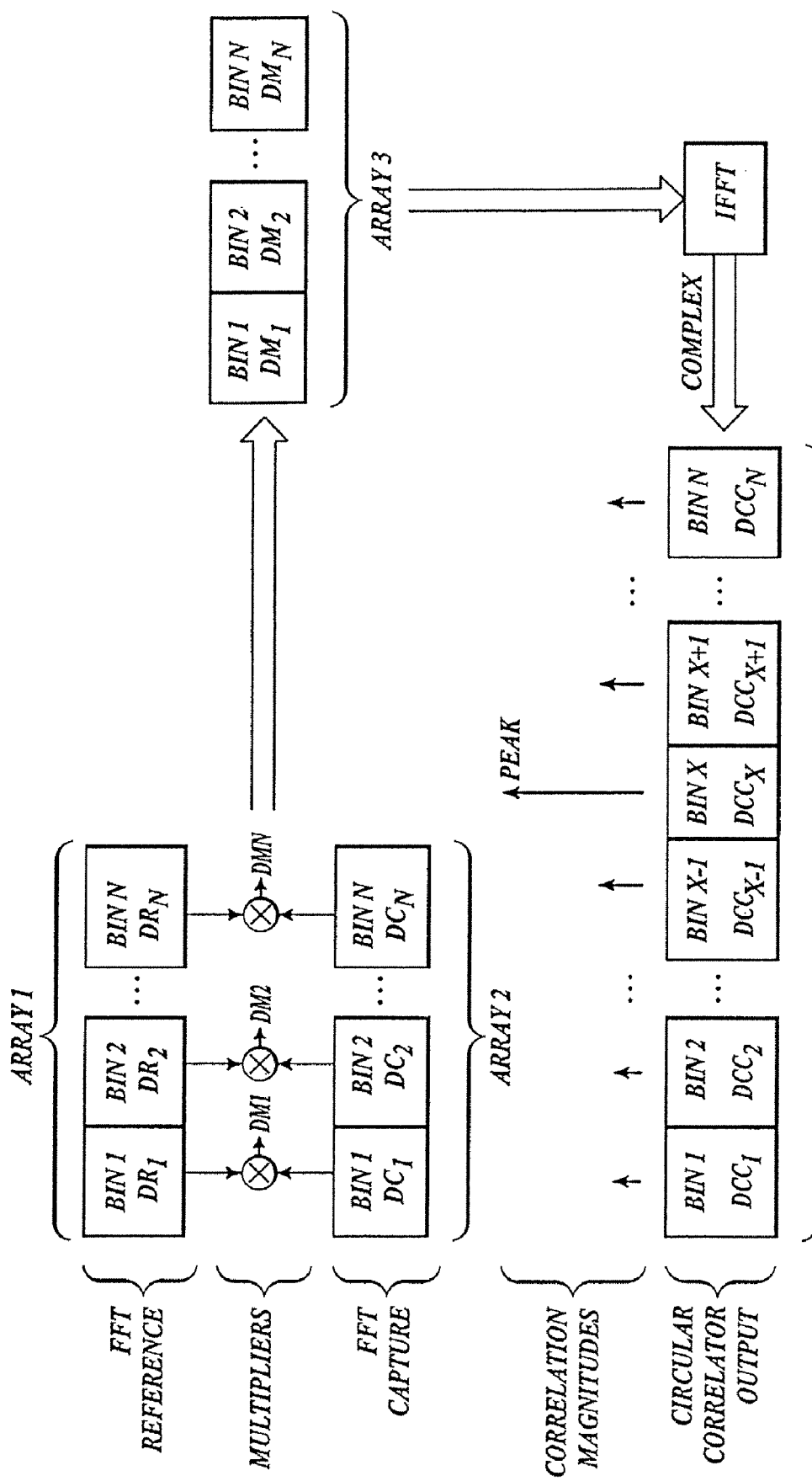

FIG. 5B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1-BIN N) is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference ad the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

Example Operational Flow

Figure 6:
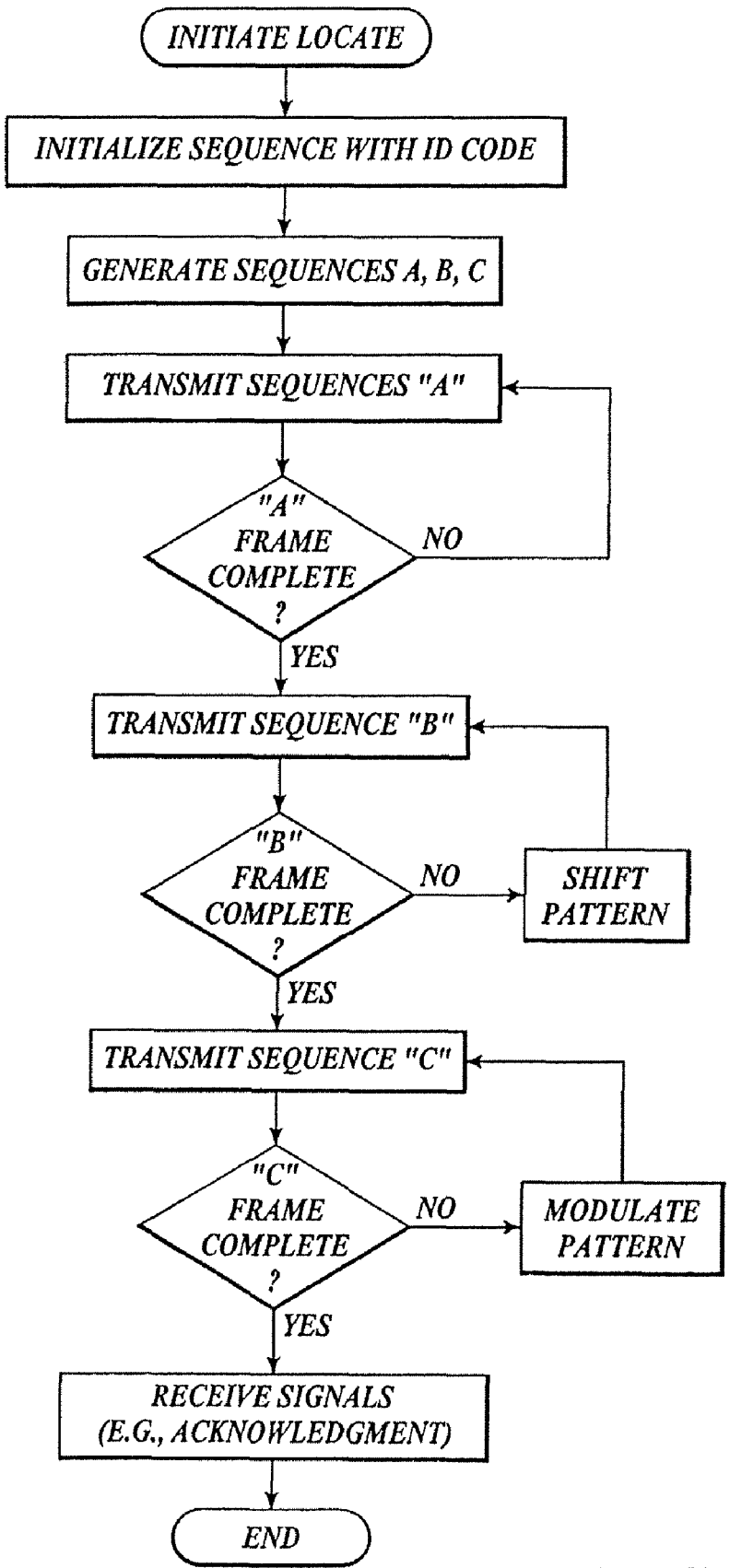
FIG. 6 is a flow-chart for an example transmitter.

FIG. 6 is a flow chart for an example transmitter in either a MT or a RL. Processing begins when a user, or some other process, initiates a request to locate a particular MT.

A transmission sequence is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"). The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), the RL begins transmitting the "C" pattern. The sequence of "C" patterns includes modulated data that may correspond to command and control information for the MT. After the modulated data is transmitted (e.g., 64 sequential pattern, or frame "C"), the RL stops transmitting and switches into a receive mode.

In the receive mode, signals are received from the MT with the RL in a similar format as provided between the RL and the MT. The RL can then calculate a distance and location based on the round-trip time and Doppler shift in the received signals as previously described. Moreover, the received "C" frame transmission may include data that is communicated between the MT and the RL, which is extracted and evaluated by the RL. Such data may include: physiological information such as heart rate, body temperature, blood pressure, heart rhythm, blood-sugar level, as well as other sensory information that is associated with a user of the MT.

Figure 7A:
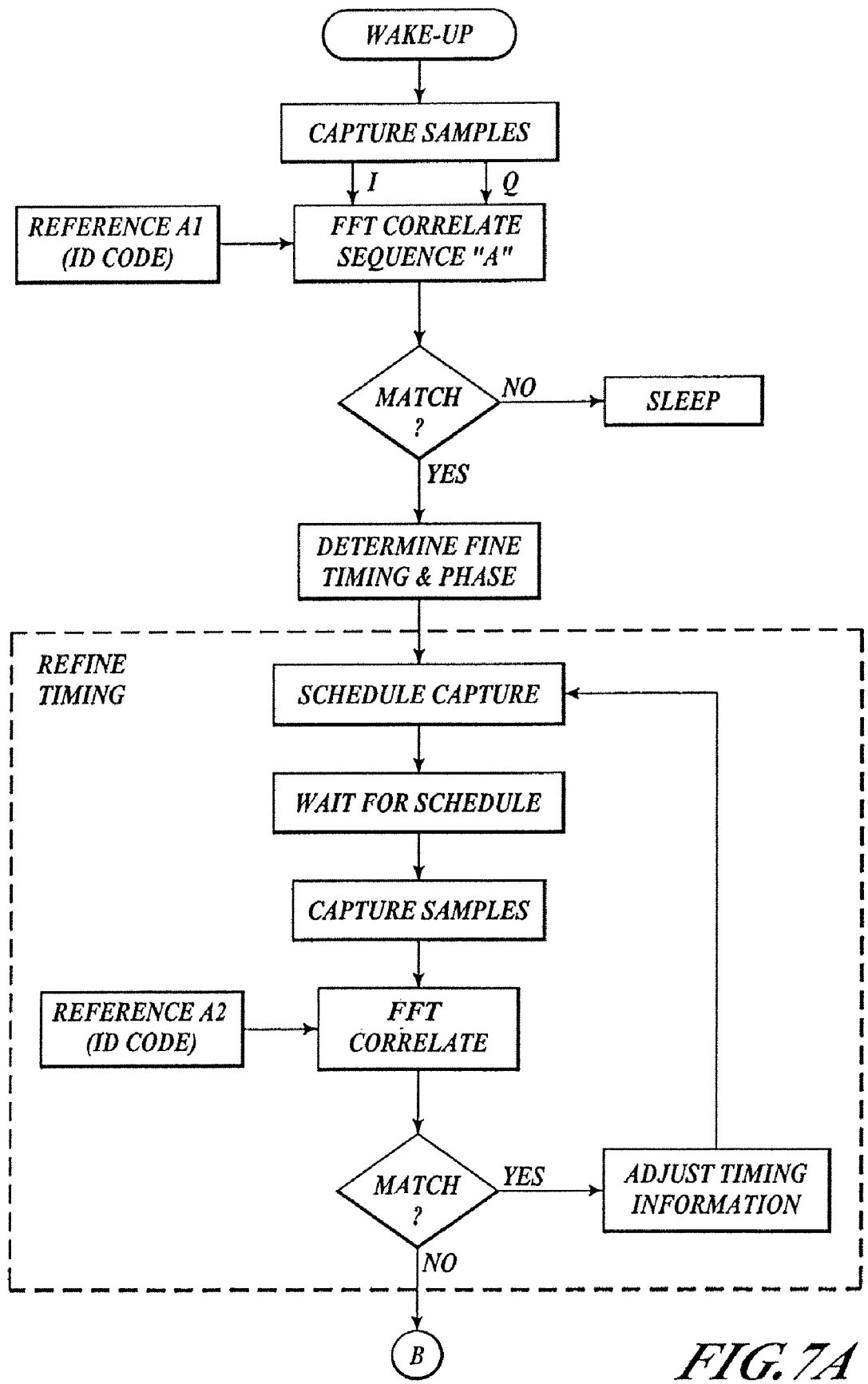
FIGS. 7A-7B, 8A-8B, and 9 are flow-charts for example receivers.

FIG. 7A is an example flow chart for an example receiver in a MT. Processing begins when the MT is activated out of a sleep mode (e.g., WAKE-UP is initiated). FIG. 7A illustrates the capture of samples associated with sequence "A" (or frame "A"). After wake-up is initiated, the receiver captures noise and/or signals. The MT will attempt to correlate the captured noise and/or signals with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings.

Timing is refined by repeatedly scheduling capture intervals. The receiver waits, and then begins capturing a portion of the samples from each scheduled capture time, and attempts to correlate the captured samples with another portion of the reference that is keyed to the code for the MT. Each time the correlation indicates a match, the timing for the receiver is adjusted (bootstrapped) to further refine the time/frequency estimates. Eventually, the correlation of pattern A fails to match the coded reference and processing continues to capture and evaluate pattern B as will be described with respect to FIG. 8A.

Figure 7B:
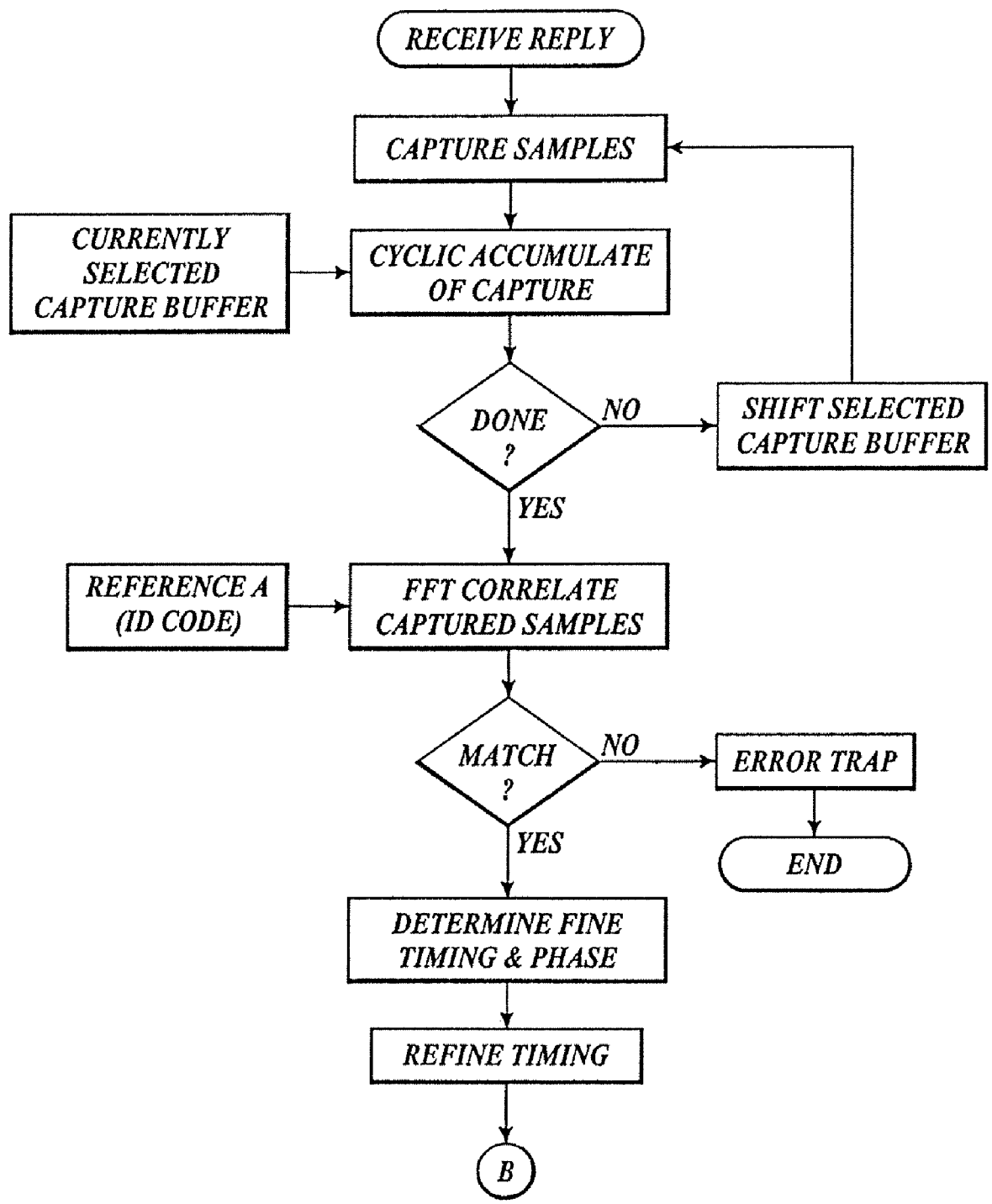

FIG. 7B illustrates the capture of samples associated with sequence "A" (or frame "A") in a receiver of an example RL device. Since the MT has limited power available for transmission, the signal may be considerably weaker than that from the RL. After wake-up is initiated by the RL, the receiver captures noise and/or signals. The RL will continue to capture the transmission for a predetermined time interval and accumulate values using a cyclic accumulation capture technique (e.g., an array of capture buffers that are cyclically selected in sequence). For each subsequent capture, the selected capture buffer is changed based on the time. Also, an accelerometer is used to measure the speed of the RL device for estimating time for reception, etc.

After the predetermined time interval expires; the RL attempts to FFT correlate the accumulated/captured signals and noise with the first portion of the unique identifier for the specific RL. The accumulation of the captured patterns over the sequence using the described cyclic accumulation improves the signal levels and minimizes the impact of noise on the reception. When the correlation fails to identify a match, the RL determines that the transmission is intended for another device, that no transmission is present, or that an error has occurred, and returns to a sleep mode. Alternatively, the RL fine timing and phase information from the transmission sequence is used to refine the receiver timings for the RL. Processing then continues to capture and evaluate pattern B as will be described with respect to FIG. 8B.

Figure 8A:
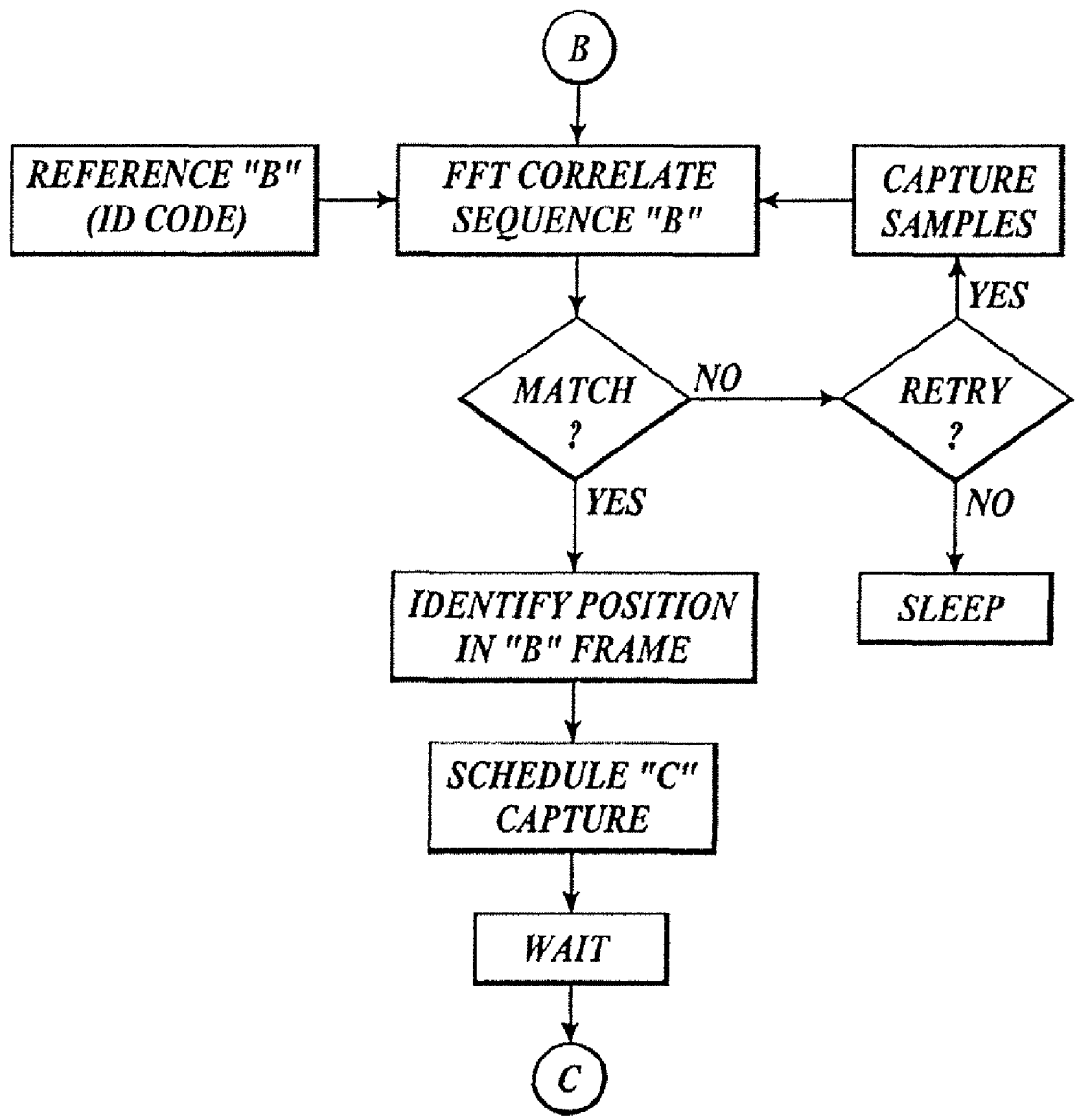

FIG. 8A illustrates the capture of samples associated with pattern "B" in a MT device. The receiver captures a sequence of samples, assuming those samples correspond to sequence "B". The MT will attempt to FFT correlate the captured samples with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 9, which follows further below.

Figure 8B:
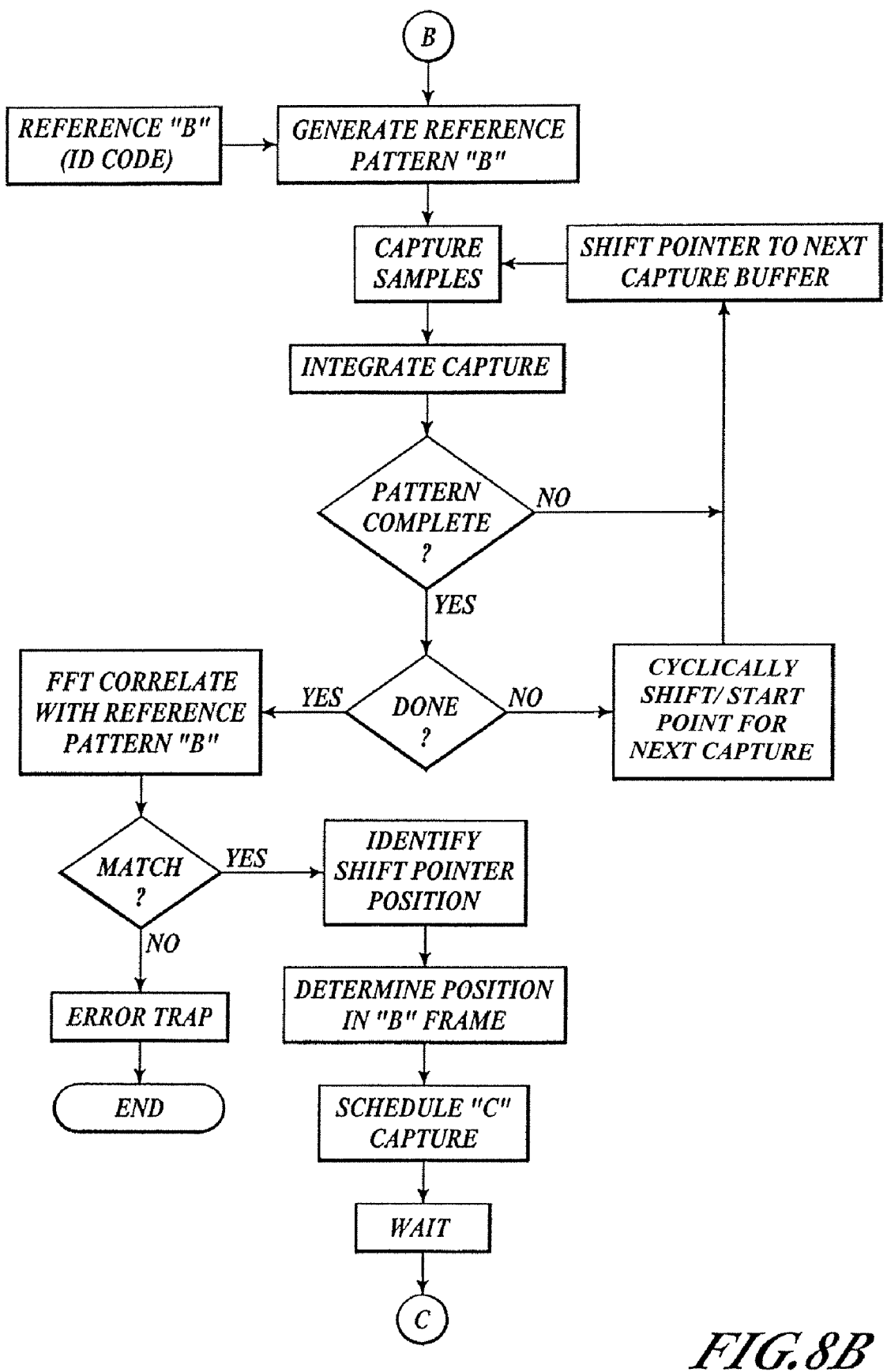

FIG. 8B illustrates the capture of samples associated with pattern "B" in a RL device. The receiver captures a sequence of complex samples (e.g., 4096 complex samples), assuming those samples correspond to sequence "B" using a cyclic accumulation/integration technique that is similar to that previously described for FIG. 7B. A reference pattern associated with pattern "B" is generated. Each received sample is captured and placed in a respective one of a series of buffers, where each buffer has an associated index such as a pointer. Each subsequently captured sample is placed in a different capture buffer (e.g., a capacitive storage cell).

As previously described with respect to the MT, sequence "B" is transmitted multiple times for receipt by the RL, where each subsequent "B" sequence is cyclically rotated with respect to the preceding sequence (e.g., see FIG. 3). As time moves forward a different capture buffer is used as the starting point for capturing a sequence by the RL. For example, assuming a 4096 complex sample pattern with a starting pointer to capture buffer 0, captures will be placed in buffers 0-4095 in sequence. After the first "B" sequence is captured, the next pattern "B" sequence will have a starting point for capture buffer 2, and captures are placed in buffers 2-4094 sequentially followed by capture buffers 0 and 1. Each buffer can be an analog storage cell so that samples from the first pattern are accumulated with the samples from the second pattern using the described method. After numerous accumulations of additional patterns, integration is completed and the accumulated signal can be evaluated.

After all of the samples for pattern sequence "B" (e.g., 4096 complex samples from a sequence of pattern "B") are received (i.e., "pattern complete") and accumulated, the RL will attempt to FFT correlate the integrated captured sequence with the previously generated pattern for pattern "B". When the FFT correlation fails to identify a match, the RL falls into an error trap. Processing a received sequence may expire without match when the transmission is intended for another MT, or perhaps when an error has occurred. An error trap handles the remaining processing when an error occurs.

When the RL finds a correlation match for the generated pattern "B", the RL can then determine the relative position of the matched pattern within the sequence (or within the frame) based on the shift position in the pattern that yields a match. Since the timing, phase, and frequency information are now known, the RL schedules to receive the "C" sequence. Processing continues for the RL in FIG. 9, which follows below.

In some examples systems the "B" sequence is sampled four times at the transmitter, with each sequence step being four samples. For this example, the receiver samples at half the transmit rate so that each shift in the pattern corresponds to two buffer locations. In other words, the starting point for each "B" sequence capture for this example always corresponds to an even numbered buffer (e.g., 0, 2, 4, ... ). The RL can then determine the relative position of the matched pattern within the sequence or frame by evaluating the starting point index to the buffer or sample bin that matches or correlates to the expected pattern.

Figure 9:
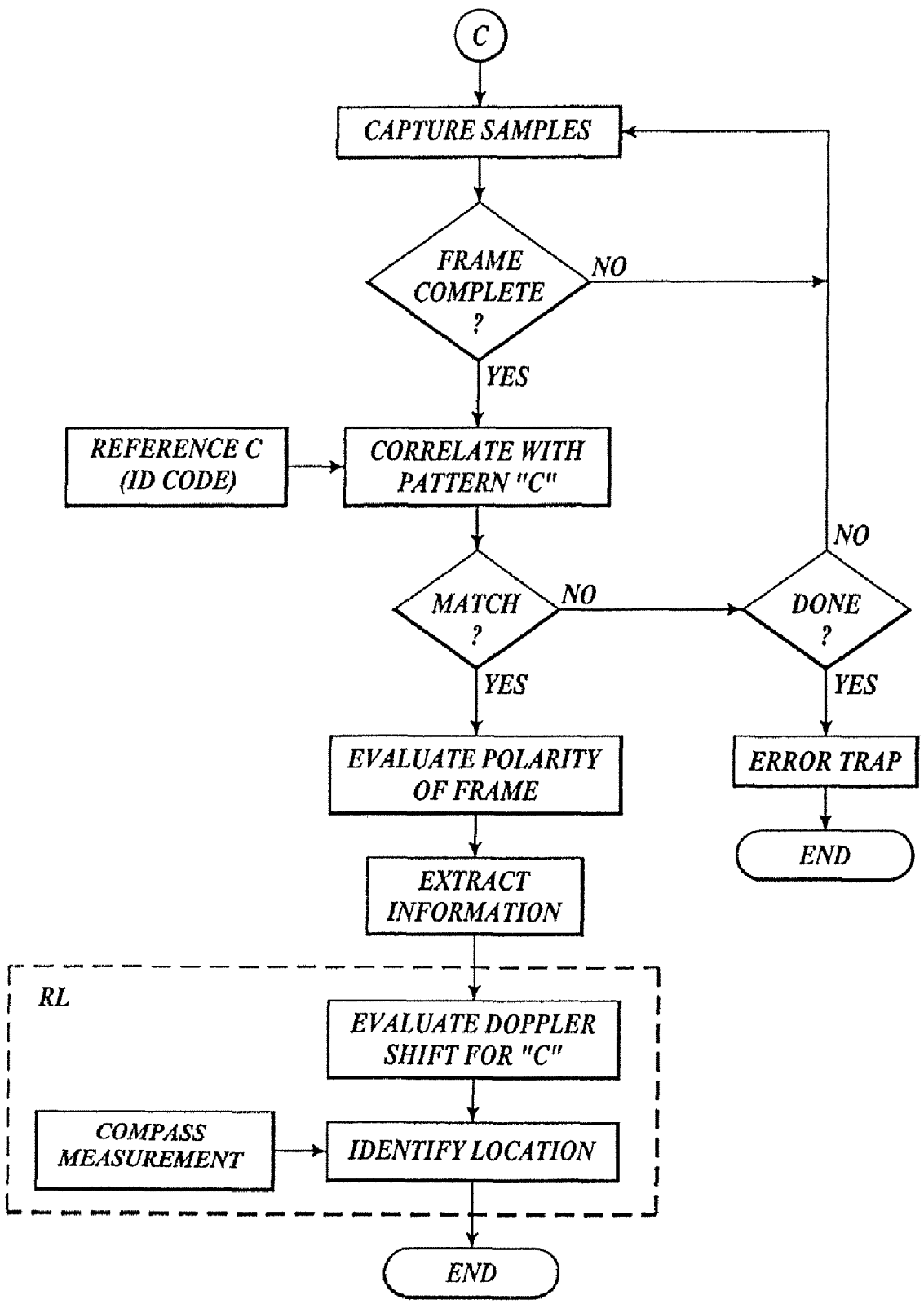

FIG. 9 illustrates the capture of samples associated with sequence "C". The receiver captures samples from the receiver in the MT, assuming those symbols correspond to pattern "C". The MT will continue to capture samples until the frame is expected to reach completion. The MT will then attempt to correlate the captured sequence (assuming it is sequence "C" from the RL) with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, the completed capture of sequence C is followed by a transmission of sequences "A", "B", and "C2" (or some other order, perhaps, or even a different set of A'B'C'. Sequences "A" and "B" include a similar pattern as previously described for the RL, although shorter in length. Sequence "C2" is still the same number of frames except that data is encoded into the transmission for communication between the MT and the RL.

In the case of the RL, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL. Moreover, measurements from the compass sensor and can be utilized to assist in determining location as will be described later.

Example Operational Features and Observations

The present disclosure merges "location request" polling with the location process itself. The RL device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's and RL's time bases (e.g., a quartz crystal oscillator) and by the relative acceleration between the RL and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of 0.5/3*10$^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the RL since the return signal is coherent plus or minus the synthetic round-trip Doppler shift with the RL's time base. A cyclic set of 4096 complex capacitive integrators can be used to perform the process of signal accumulation to raise the weak signals up and out of the noise floor. The complex patterns (e.g., a pattern of length 2047 chips) have approximately 33 db of spreading gain. The addition of the cyclic integrators can achieve an additional 20 db of signal gain with the repetitive portions of the signal, yielding 53 db of total gain. A bandwidth reduction from 26 MHz down to about 100 Hz is achieved with this technique. The thermal noise over the 100 Hz bandwidth is approximately −154 dbm, where reasonable signal reception is expected around a noise level of −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the RL. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 µs would correspond to a first complete signal null.

The RL will in general receive a signal whose cadence and frequency very closely match its internal crystal clock, and thus the RL can use long cyclic integration times, which greatly increase the available signal to noise ratio. The described coherent integration (or coherent accumulation)

process has a signal power maximum when the signal has rotated through 180 degrees at the end of the capture interval. For a 3.5 ppm frequency tolerance, when the period of the spread signal is designed to be about 150 μs. It is advantageous to use a signal which is itself complex. Improved orthogonality between coded signals is achieved by using a complex signal. For example, the Gold codes used in the GPS system have a length of 1023 chips with a cross correlation of approximately −24 db for 1025 possible codes. The complex signaling codes employed in the presently described disclosure is on the order of length 2047 chips, with a cross-correlation of −33 db for 2048 possible codes. The use of complex codes allows for improved signal rejection.

The round trip Doppler shift between slowly moving objects (e.g., people walking) is on the order of 4-5 ppb. Slowly moving objects provide a significantly longer integration time in cases where the received signal is likely to be very close in frequency to the RL's time base. Even automobile speeds will result in a round-trip Doppler-shift of 200 ppb or less.

RL Compass Operation

The described system performs distance measurement by round trip time measurements. According to the present disclosure, an economical solution is available for a remote locator (RL) device that does not require accelerometers or multiple antennas for resolving directional information. A compass sensor can be adapted for use in the RL such that the target direction (the direction towards the MT from the RL) can be continuously displayed despite any relative change in the RL's orientation. Diversity antennas can be used to gain additional information about signal strength, distance and Doppler, etc.

Initially, when the user of the RL seeks to find an MT, a "search" mode is engaged. When the RL receives a satisfactory counter-signal from the MT the RL can determine the distance to the MT and provide an appropriate alert indicator to the user. Alert indicators may include, for example, an audible indicator via the audio output device, a visible indicator via the video output device, or a vibrating indicator.

After the initial search and alert are completed, the user can activate a "locate" mode. In the locate mode, the user holds the RL away from the body approximately at an arms length. The user then moves the RL through at least a portion of an arc or through a complete circular motion that is centered approximately about the user's head) to scan for the MT. During the locate mode, the RL will handshake many times with the MT while acquiring a series of data items such as time of arrival (TOA), and Doppler readings which are interferometric. As the RL is spun in a circular motion, compass readings are also taken. The compass readings are associated with distances and Doppler readings. The distance change associated with the rotation is doubled by the round-trip transit time. In one example, a user may extend the RL away from his body around 70 cm of distance, and the corresponding round-trip time variation is around 280 cm, or about 8 waves at a frequency of 915 Mhz.

Figure 10A:
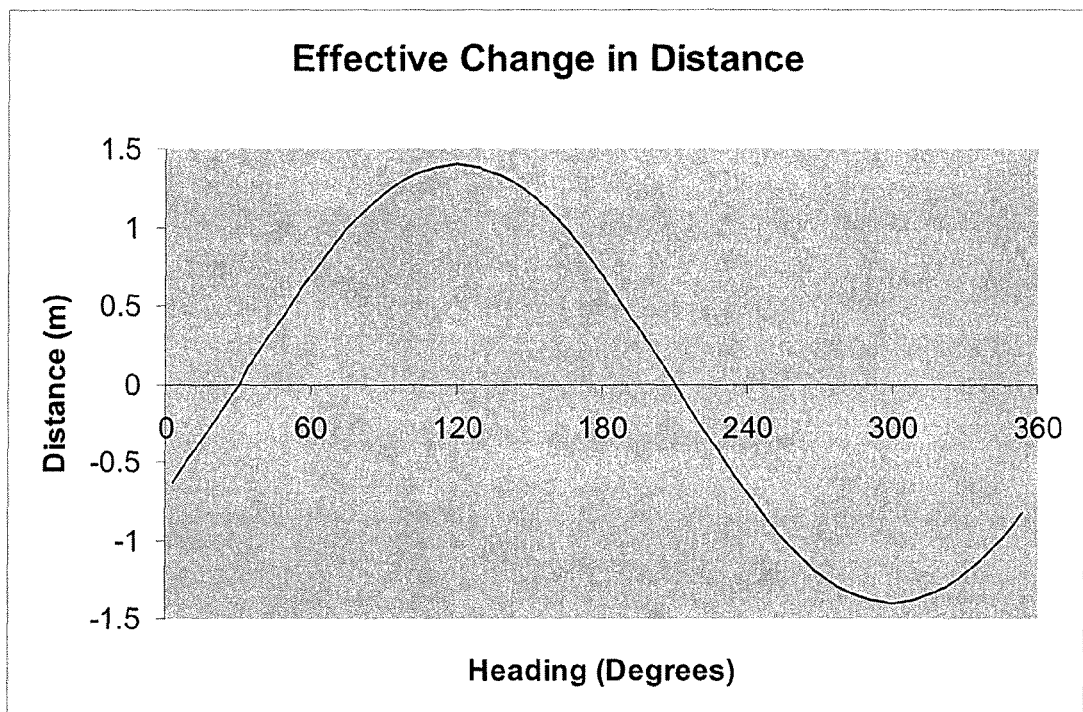
FIG. 10A is an example graph for effective change in distance during a rotation through 360 degrees.

An example user rotates the RL at a variety of rates that can range between around 36 degrees/second and 180 degrees/second. The distance measurements that are acquired by the RL will fluctuate based on the RL's relative orientation relative to the MT. In other words, the distance between the RL and the MT is a function of the rotational position of the RL during the circular spin. The distance is also a function of the distance the user extends his arms to hold the RL away from their body during the rotational movement. In one example, the user holds the RL 70 cm away from their body, the compass reading has an initial reading of 84 degrees and the actual target is located at a heading of 120 degrees. For this example, the heading difference between the initial reading and the actual target is 34 degrees, which result in a distance change between the actual target and the user of: 2·0.7 m·COS(34°) =1.1326 m. As the user continues to rotate about their centerline, the distance to the target continues to change as illustrated by FIG. 10A. When the RL is oriented at the target heading of 120 degrees, the distance change peaks (1.4 m), while the distance change is lowest (−1.4 m) when the RL is oriented at the heading of 300 degrees since the RL is positioned at the furthest point relative to the target (180 degrees away from the target).

Figure 10B:
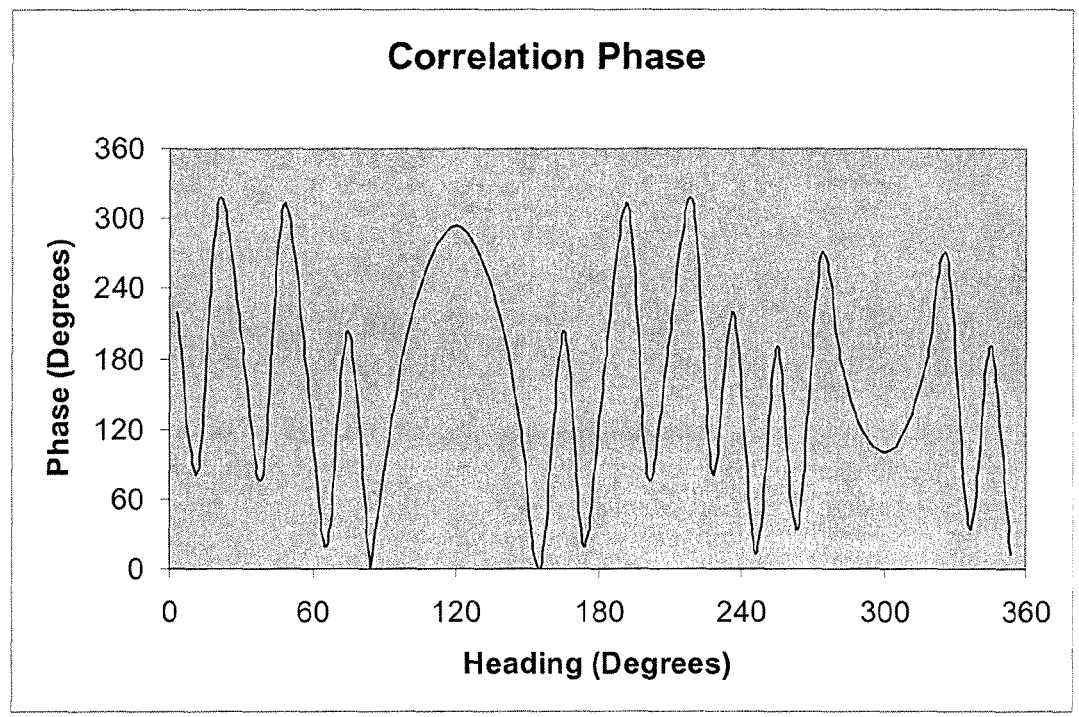
FIG. 10B is an example graphs for correlation phase information from a rotation through 360 degrees.

The heading from the RL to the MT is unknown until at least a partial rotation is complete and sufficient data is collected of compass readings, distance measurements, and Doppler readings to resolve the proper direction. The correlator in the RL is arranged to generate correlation phase information heading between the target location (the MT) and the RL. The correlation phase information is illustrated by the graph of FIG. 10B, where the correlation phase (Phase) is determined by the following equation: Phase=360°·(Φ−Δd/λ), where Φ is the initial correlator phase, Δd is the change in distance for a given directional heading, and λ is the wavelength of the transmission.

As described, the RL is arranged to collect a series of compass headings and distances to resolve a target location for the MT. The motion or action required of the user is relatively intuitive in that the circular motion required for the RL is similar to the motion required for a user to visually search by "looking around" their current location. The cost of a RL that is employed in the above-described examples is reduced considerably since the use of accelerometers is not required. Moreover, the cost associated with some conventional two axis compass sensor devices is currently less than approximately two dollars.

Look Around Procedure

Figure 11C:
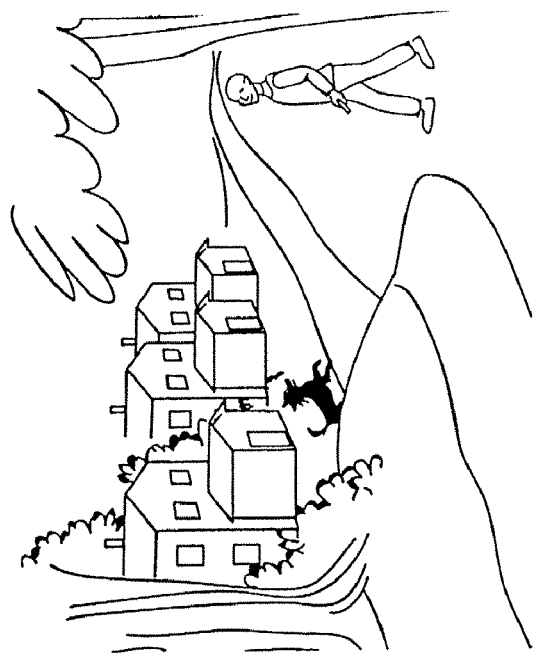
FIGS. 11A-11C are example illustrations for a look-around procedure that is employed by a user in a search and locate mode.
Figure 11B:
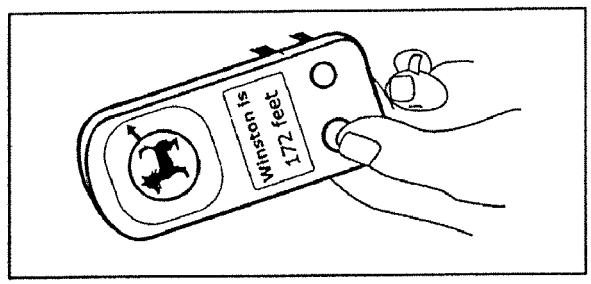
Figure 11A:
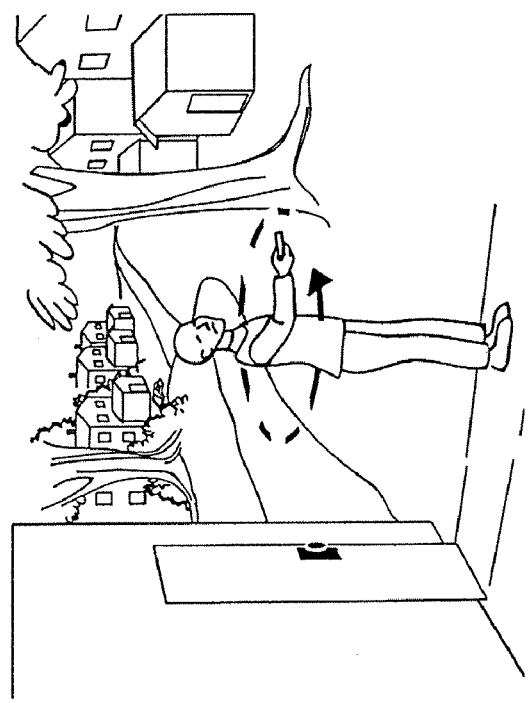

FIGS. 11A-11C are example illustrations for a look-around procedure that is employed by a user in a search and locate mode arranged according to at least one aspect of the present disclosure. The procedure illustrated by these figures depicts an owner that is searching for their dog, which has disappeared in the neighborhood. The dog has a MT device affixed to their collar, for example, so that the dog can be found with a hand-held RL device. The description is not intended to be limited to locating animals, and can be used to locate any object, person, animal, or thing that has a transponder device affixed thereto, or perhaps implanted therein As illustrated in FIG. 11A, a person comes out of their home to search for a runaway dog (e.g., "Winston" the dog) while holding an RL device, which is depicted in this example as a small hand-held device. The person activates the RL device into a search mode by pressing one of the buttons on the device (see FIG. 11B), and the RL transmits a ping to the MT. If within range, the MT transmits a reply to the RL. When the RL recognizes that the MT has been found, a user alert is issued such as an audible beep or a visible indicator. At this point the person activates the locate mode by pressing one of the buttons on the device. During the locate mode, the person extends their arm away from their body and rotates the RL about their centerline (e.g., see the dotted line in FIG. 11A), such as by pivoting about their heels.

Once a sufficient rotation has been completed the RL has found the MT (aka "Winston" the dog), and a directional indicator is illuminated on a display of the RL device as shown in FIG. 11B. Also shown in FIG. 11B, the distance between the RL and the MT is displayed indicating that "Winston" is located 172 feet away towards the right. As shown in FIG. 11C, the person then walks in the direction of the arrow on the display of the RL to locate the dog. As the person approaches the dog, the distance measurement will be updated to indicate that they are getting closer and closer. Once the person is within a close proximity (e.g., 10 feet) of the dog, the RL can provide a short audible indicator and then go to sleep mode.

Ping Modes

Figure 12:
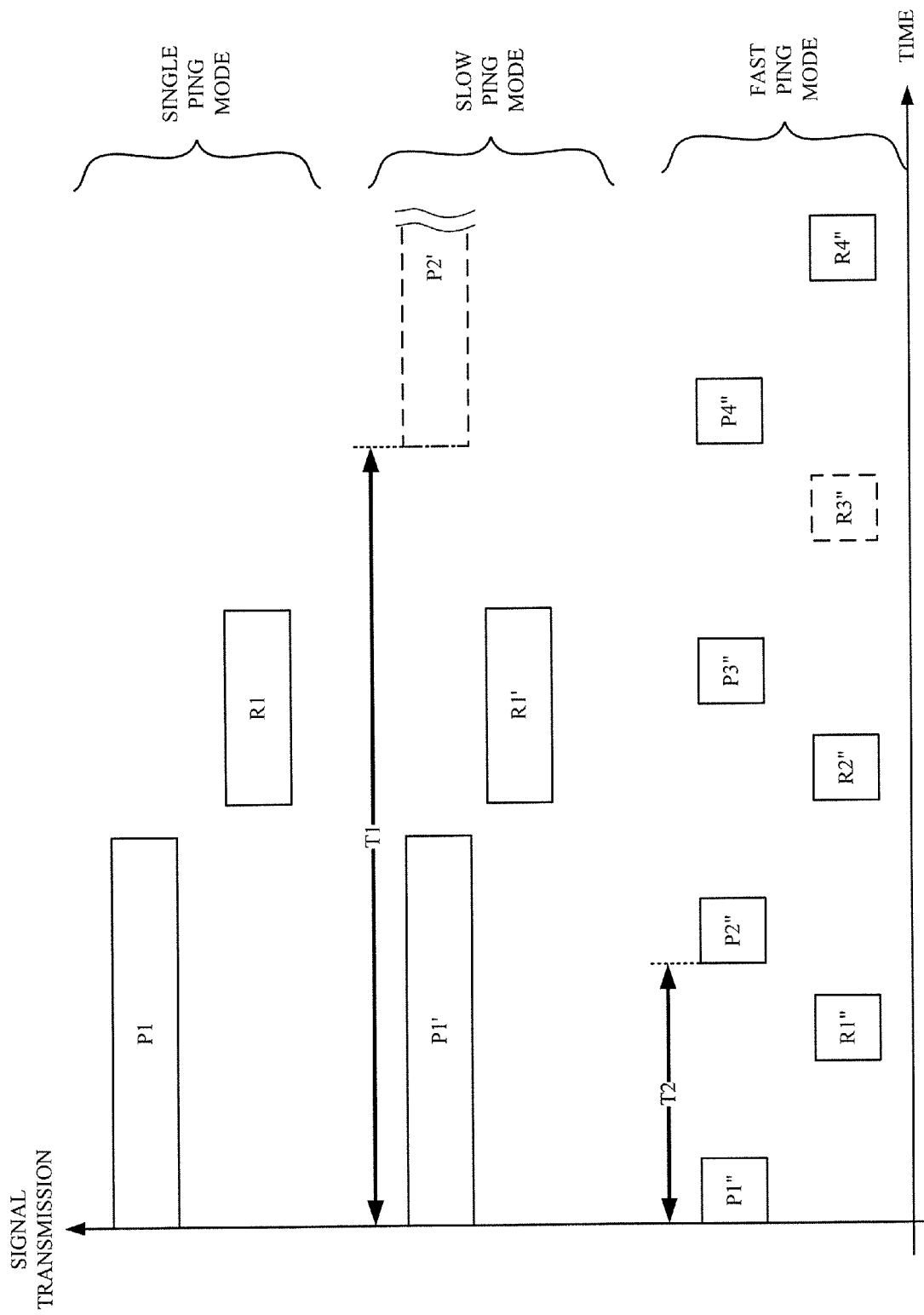
FIG. 12 is an example diagram illustrating single ping mode, slow ping mode, and fast ping mode.

FIG. 12 is an example diagram illustrating single ping mode, slow ping mode, and fast ping mode. As previously described a "ping" corresponds to a complete transmission by the RL to the MT, such as a complete set of the three frame transmission sequence. Similarly a "reply" corresponds to a complete set of frames from that are transmitted from the MT to the RL. In FIG. 12, each block designated as Px is intended to indicate a time of transmission for a ping that includes a complete set of frames, while Rx is intended to indicate a time of transmission for a reply that also includes a complete set of frames.

The described system performs distance measurement by round trip time measurements. The ping modes are arranged to provide regular communications between the RL and the MT, where distances can be tracked without excess energy consumption or spectral pollution. After an MT and RL have exchanged signatures, they share very precise mutual clock rate information. The accuracy of this clock rate information, absent any Doppler shift, is one part per billion or better. As time elapses between transmissions, the unit time bases, which aren't perfectly steady, will drift with respect to each other. By calibrating the low-speed sleep mode oscillator against the high-speed clock, so that a given sleep period can be accurately enumerated as a known number of high-speed clock periods, it is possible to accurately measure periods of several minutes without actually operating the high-speed clock. However, a long initial baseline for frequency determination is necessary to initially synchronize the clocks between the MT and the RL. Once synchronized/calibrated the precise timing is known and shorter transmissions are possible.

In the single ping mode, the RL transmits a single ping (P1) to the MT. The MT receives ping P1 when it within a transmission range of the RL for proper reception. The MT is arranged to transmit a reply (R1) to the RL in response to ping P1 when the ping is properly recognized as coded for the particular MT.

In the slow ping mode, the RL is arranged to continuously transmit a series of single pings (P1', P2' . . . PN') to the MT. Each subsequent ping is separated in time by a ping interval (T1) as illustrated. The MT receives each ping when it is located within a transmission range of the RL for proper reception, and transmits a corresponding reply (R1', R2' . . . RN') for each ping that is properly recognized as coded for the particular MT.

In the fast ping mode, the RL is arranged to continuously transmit a series of short duration single pings (P1", P2" . . . PN") to the MT. Each subsequent ping is separated in time by a ping interval (T2), which is significantly shorter in time than ping interval T1. For example, each ping in the fast ping mode is on the order of hundreds of microseconds to a few milliseconds in length. Since the timing and cadence is know from prior receptions, the coarse timing is already known and the RL is able to utilize greatly abbreviated transmissions. The short duration ping can be accomplished using just a portion of an "A" sequence. The MT receives each ping when it is located within a transmission range of the RL for proper reception, and transmits a corresponding reply (R1', R2' . . . RN') for each ping that is properly recognized as coded for the particular MT.

It is important to note that the MT may not always be able to properly receive a particular ping from an RL in even though it is properly coded for recognition by the MT. Environmental conditions such as noise, buildings, and other electronic interferences may inhibit a ping (e.g., ping P2') from reaching the intended MT. Similarly, environmental conditions may cause a reply (e.g., reply R3") from reaching the intended RL.

Example Operation of the RL in Search and Locate Modes

FIGS. 13A-13D are example flow charts for example mode selection features for an example remote locator (RL) arranged according to at least one aspect of the present disclosure.

Initially, a user input is asserted to activate the search mode on the RL, such as by activation of a button shown as shown in FIG. 11. The user input is evaluated by the mode logic in the RL to decide if the user is requesting the search mode. The search mode can be implemented as a single ping mode or a multiple ping mode.

Figure 13A:
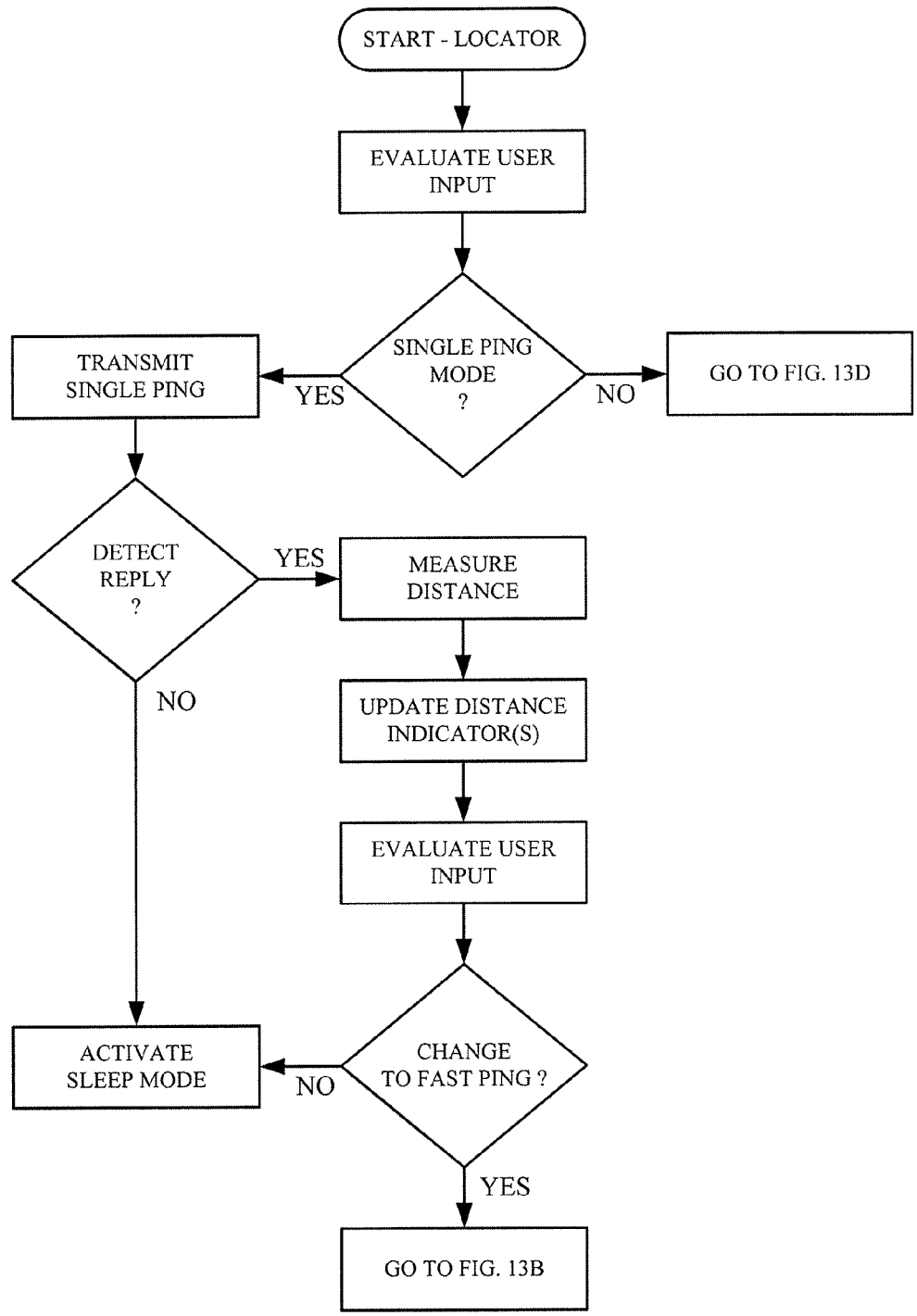
FIGS. 13A-13D are example flow charts for example mode selection features for an example remote locator (RL)

As described in FIG. 13A, a single ping is transmitted from the RL to the MT (e.g., P1 from FIG. 12) when the single ping mode is selected by the user for the search mode. The RL then waits to detect a reply from the MT (e.g., R1 from FIG. 12). If no reply is detected, the RL device activates a sleep mode to conserve power. When a reply is properly detected from the MT, the RL measures the distance to the MT based on the round-trip time of the ping and the corresponding reply. Indicators on the RL are updated to alert the user of the currently determined distance. Example indicators include an LCD display that indicates the current distance, an audible indicator, a vibrating indicator, as well as others. The RL then waits for another user initiated input to change from the search mode to the locate mode. The locate mode requires a fast ping sequence as will be described with reference to FIG. 13B. Otherwise, another mode can be selected or the device can go to a sleep mode to conserve power.

Figure 13B:
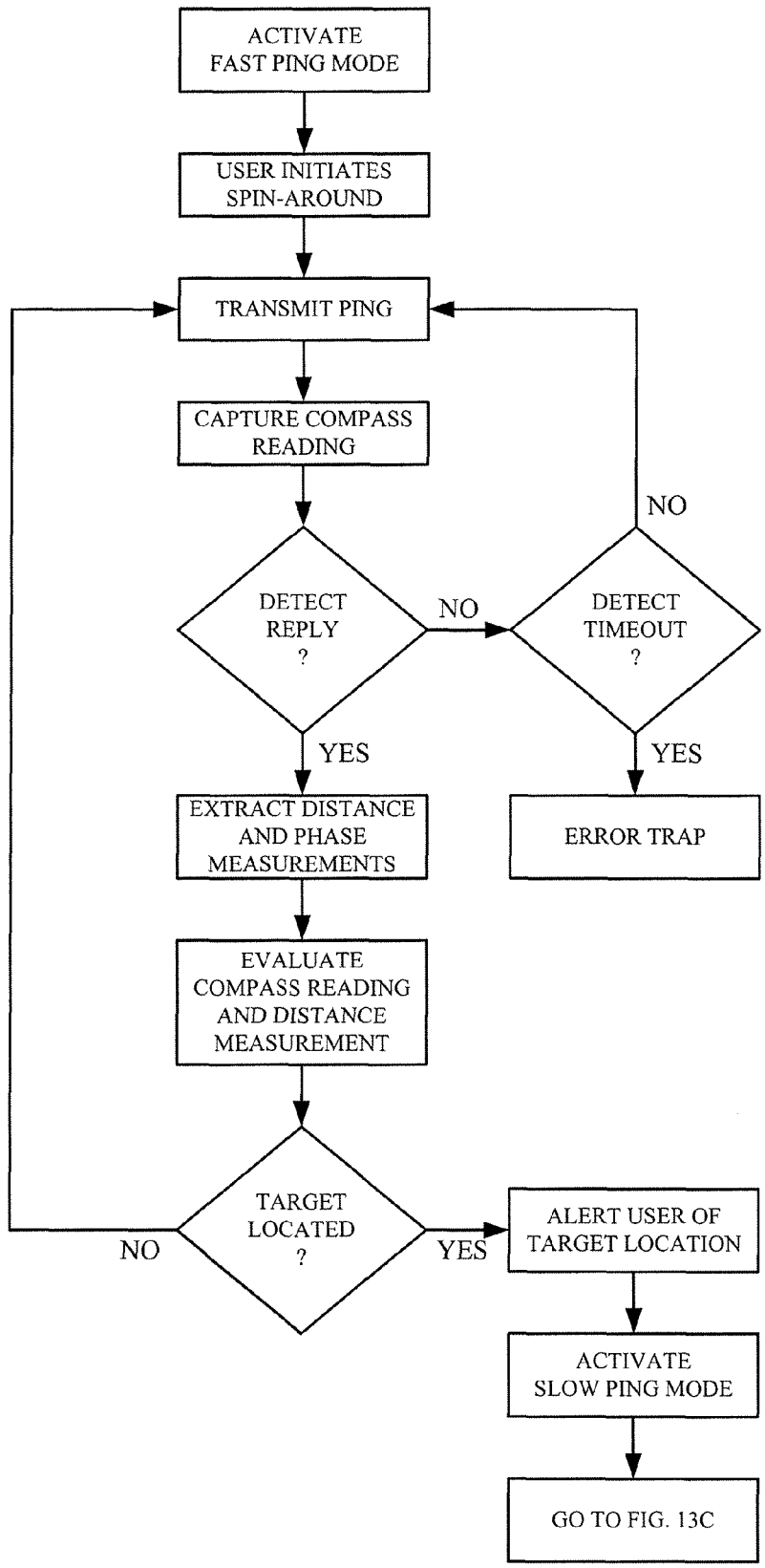

Referring now to FIG. 13B, a fast ping mode is activated by the RL then user selects the locate mode. During the locate mode, the user initiates a spin around procedure such as that previously described, and the RL transmit pings at a more frequent interval such as illustrated by time interval T2 in FIG. 12. After each ping is transmitted by the RL, compass readings are captured and the RL looks for a reply from the MT. A timeout detection and error trap procedure can be employed to take appropriate action (e.g., go to sleep mode) when the MT does not reply within a prescribed time limit. Otherwise, each reply from the MT is analyzed to determine distance and phase information as the spin around is initiated. The compass readings are analyzed with the calculated distances to determine if an initial location for the target has been identified. As previously described with reference to FIGS. 10A and 10B, the calculated distance will change as the user initiates the spin-around such that a minimum distance can be identified when the RL is oriented at a closest point towards the MT. The captured data can be further analyzed to ensure an accurate reading on the compass. The RL includes updates direction indicators for based on the identified initial location as illustrated in FIG. 11, where a compass is illuminated to identify the heading to the target and an LCD display indicates the range to the target. Once the user has located the target, the slow ping mode is activated (see FIG. 12) and processing continues to FIG. 13C.

Figure 13C:
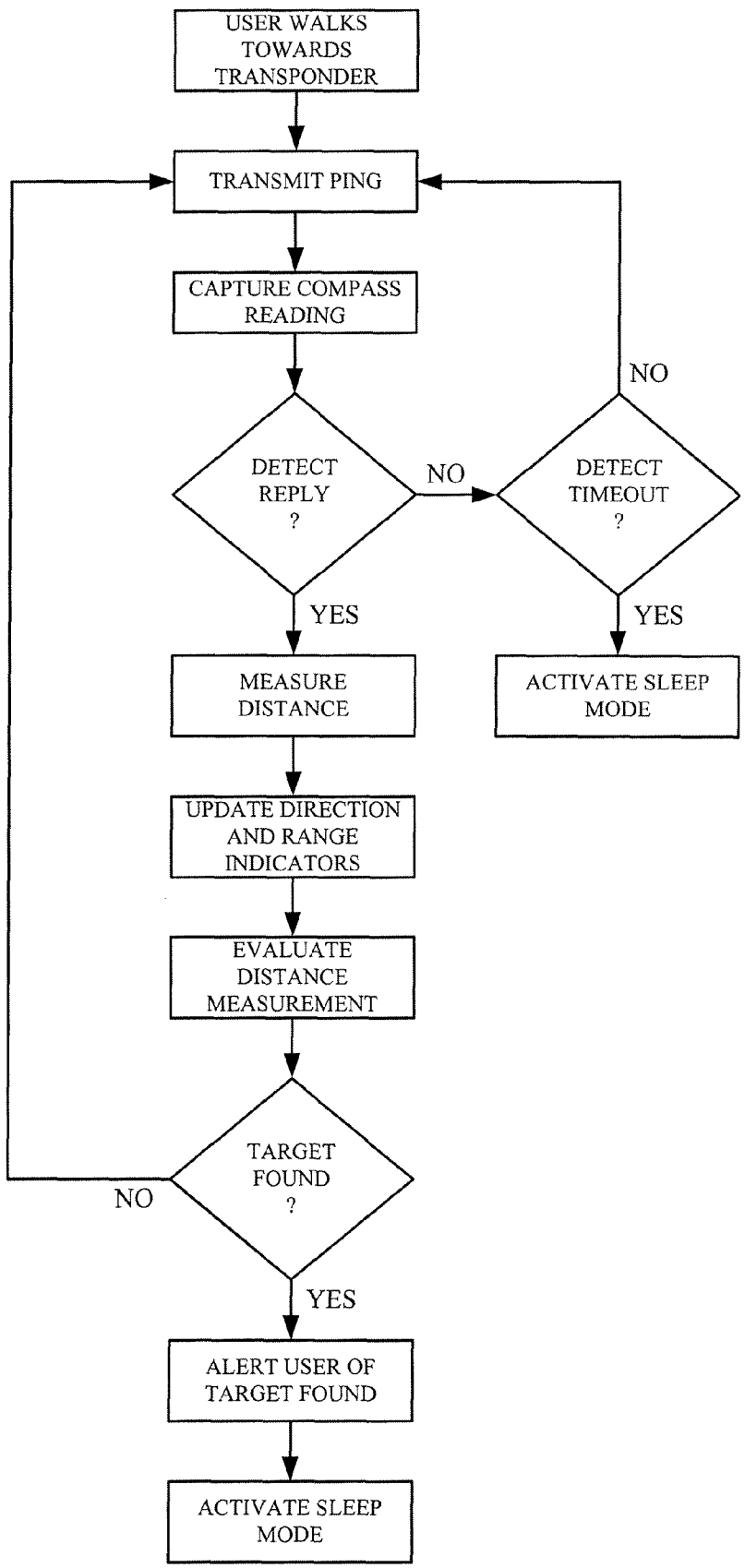

As shown in FIG. 13C, the user can begin walking towards the MT after the initial location is identified. The RL transmits a slow ping, where each subsequent ping is spaced apart in time such as is illustrated by time interval T1 in FIG. 12. Compass readings are captured and the distance measurements and current direction indicators are updated each time a reply is received from the MT. The desired direction to locate the MT is also indicated on the RL so that the user can monitor if they are walking in the proper direction or not. Once the RL is within a prescribed range such as 10 feet, for example, the RL provides an alert indication (e.g., a sound, a flashing light, a vibrating alert, etc.) that the target has been found and the RL goes to a sleep mode. A timeout detection and sleep mode activation can be employed for cases where the RL loses communication with the MT once the slow ping mode is enabled.

Figure 13D:
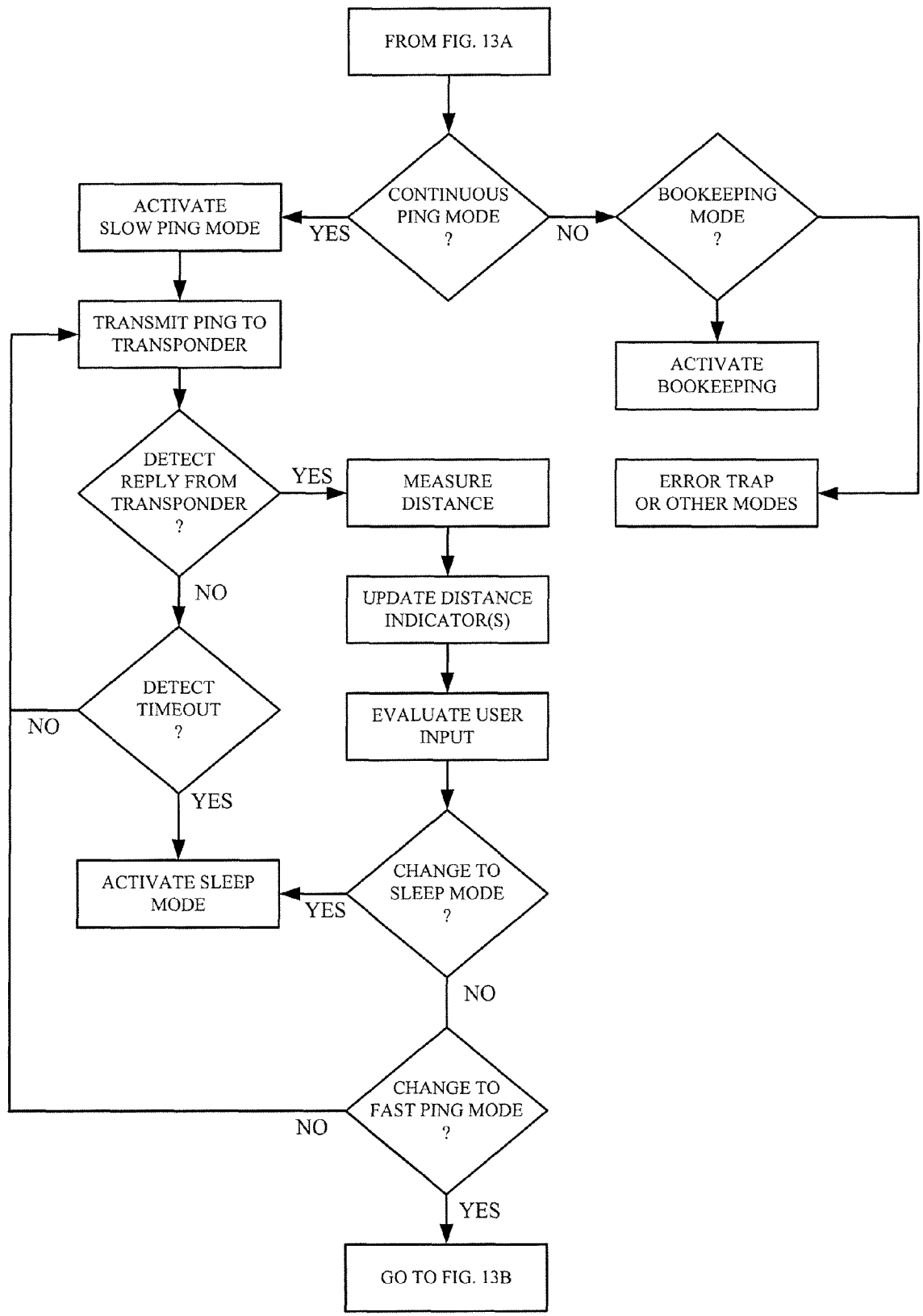

When a mode other than the single ping mode is selected by a user from FIG. 13A, processing continues to FIG. 13D. A continuous ping mode can be activated by the user for the search mode, where a slow ping is periodically transmitted from the RL to the MT. Distances are calculated and compass readings are captured when the RL detects a reply from the MT. Distance indicators are then updated on the RL (e.g., range readings are updated, lights are activated, sounds are initiated, etc.). User inputs are evaluated during the continuous ping mode to permit selection of any number of modes such as a sleep mode or activation of the locate mode such as described above with reference to FIG. 13B. When replies are not received from the MT with a prescribed timeout period, the device can again go to a sleep mode to conserve power. Other example modes can include bookkeeping modes were data and other diagnostic information can be collected by the RL, or perhaps the RL can transmit a command for the MT to log or transmit other information.

Example Operation of the MT in Search and Locate Modes

Figure 14A:
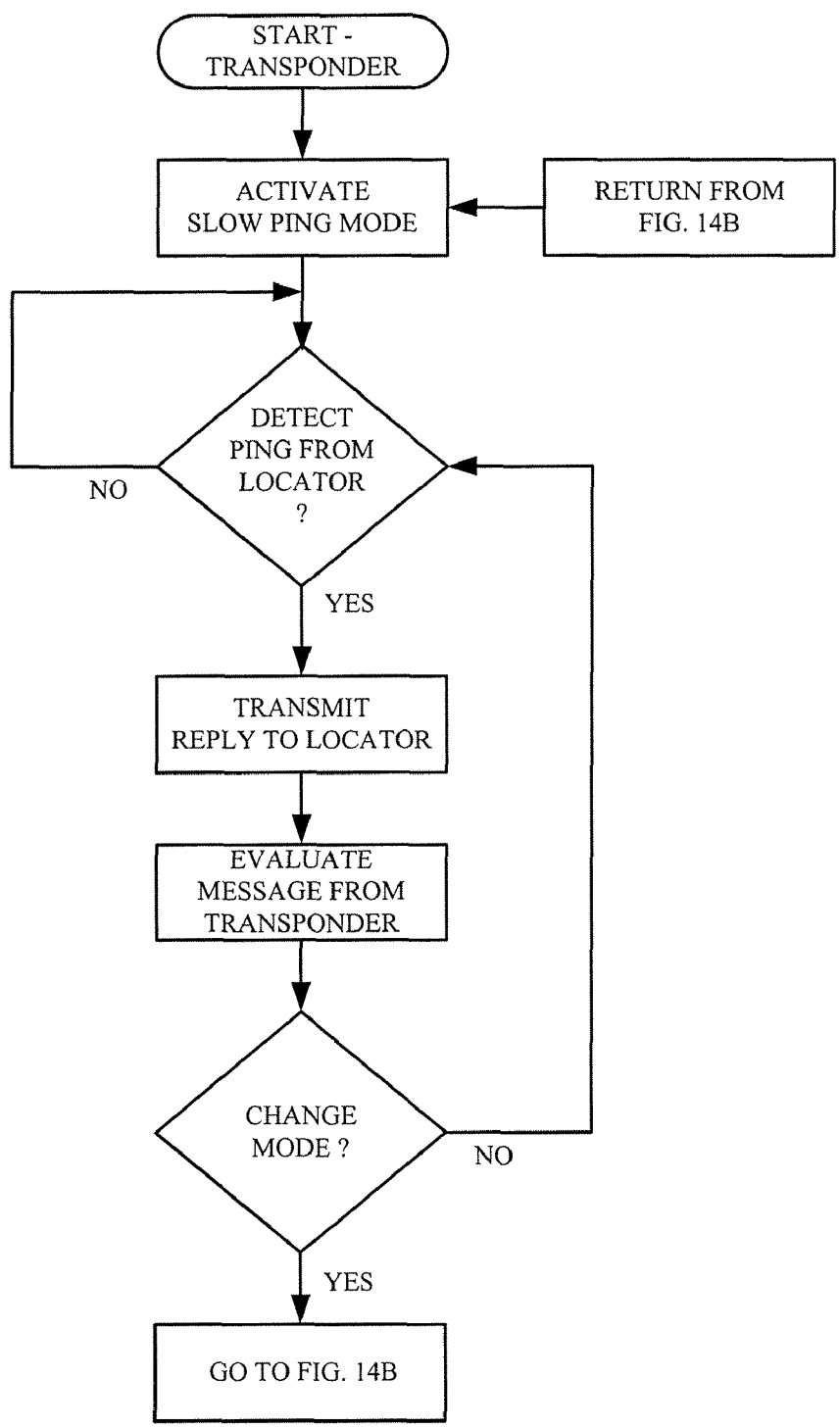
FIGS. 14A-14B are example flow charts for example mode selection in an example micro-transponder (MT), arranged in accordance with at least one aspect of present disclosure.
Figure 14B:
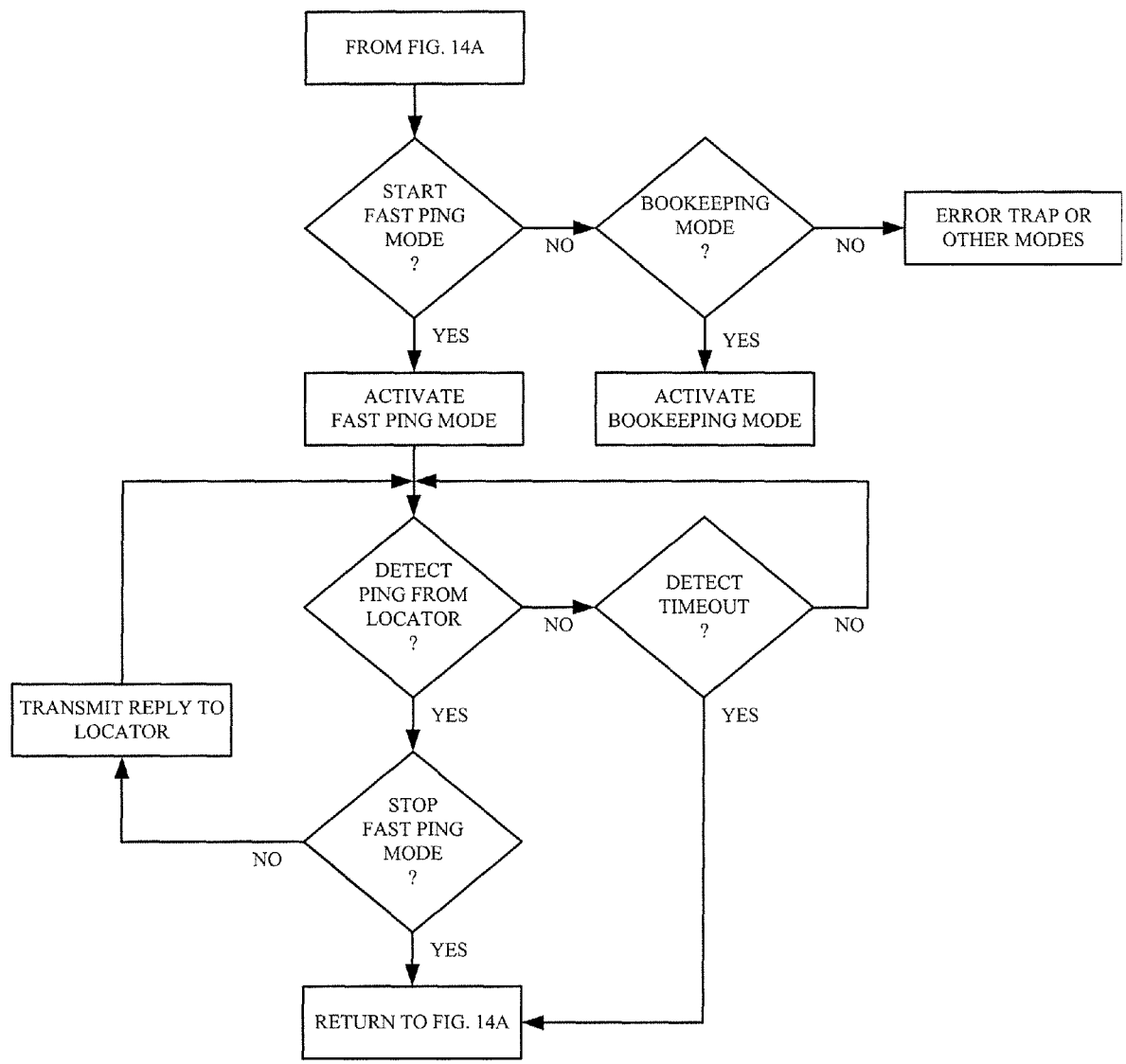

FIGS. 14A-14B are example flow charts for example mode selection in an example micro-transponder (MT) arranged in accordance with at least one aspect of present disclosure.

As shown in FIG. 14A, the transponder is initially in a slow ping mode such as described previously. When a ping is detected from the RL, the MT transmits a reply to the RL and evaluates any coded messages or commands that are communicated in the ping. When the RL requests the MT to change modes, processing continues to FIG. 14B.

The change mode request is evaluated by the MT in FIG. 14B. The mode request may be to change to a fast ping mode, enter a bookkeeping mode, or some other mode as may be desired. In the fast ping mode, the MT monitors received signals more frequently than the slow ping mode and provides a rapid reply to the RL. In the bookkeeping mode, the MT encodes additional information into reply messages for the RL such as, for example, estimated battery life, environmental sensor data such as ambient temperature and pressure, biological sensor data such as heart rate and blood pressure, receiver signal quality, receiver signal strength, etc. Eventually, the RL will transmit a signal to change modes back to slow ping mode and the processing will return back to FIG. 14A. Otherwise, a timeout may occur when pings from the RL fail to be detected for a predetermined time interval and processing will again return to the slow ping mode to conserve power.

The presently described system, apparatus, and methods take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

What is claimed is:

1. A portable remote locator device that is operated by a user to determine a relative distance and direction from the portable remote locator device to an object that is tagged with a transponder, the portable remote locator device comprising:

an input device that is arranged to accept user initiated input;

a time control circuit that is arranged to provide timing control signals according to an internal clock of the portable remote locator device;

an indication means that is arranged to report information to the user;

a transmitter means that is arranged to transmit a structured transmission to the transponder when activated, wherein the structured transmission has a transmit cadence and frequency that is determined by the internal clock, wherein the structured transmission is coded with an identifier recognized by the transponder;

a receiver means that is arranged to capture samples when activated;

a correlator that is arranged to identify a correlation and a correlation phase in response to captured samples from the receiver means;

a means for determining a rotational position associated with the portable remote locator device about an axis that is approximately centered about the user of the portable remote locator device; and a processor means that is arranged in cooperation with the input circuit, the time control circuit, the indication means, the transmitter means, the receiver means, the correlator, and the means for determining a rotational position, wherein the processor means is arranged to initialize the portable remote locator device in a slow ping mode, wherein in the slow ping mode the processor means is arranged for:

initiating the transmission of a first structured multi-frame transmission to the transponder device at a first time, detecting a first reply from the transponder device at a second time when the received samples correlate with an expected first reply transmission;

measuring a distance between the portable remote locator device and the transponder based on a difference between the second time and the first time;

wherein the processor means is also arranged to operate the portable remote locator device in a fast ping mode, wherein in the fast ping mode the processor means is arranged to collect a stream of measurements over multiple communications with the transponder in the fast ping mode by repeatedly:

initiating the transmission of a second structured multi-frame transmission to the transponder device at a third time;

detecting a second reply from the transponder device at a fourth time when the received samples correlate to an expected second reply transmission;

measuring a distance between the portable remote locator device and the transponder based on a difference between the third time and the fourth time;
monitoring the correlation phase and rotational position associated with each received sample from the second reply;
determining whether a complete rotation has been successfully completed by the user based on the monitored rotational position;
terminating the fast ping mode when either a complete rotation has been successfully completed or a timeout condition is detected by the processor means; and
wherein the processor means is also arranged to determine the distance and direction to the remote locator after the fast ping mode has terminated by evaluating the stream of measurements, wherein the stream of measurements corresponds to the collection of phases, correlation phase, rotational positions, signal strengths, distance.

2. The portable remote locator device of claim 1, the input device comprising an interrupt signal, a wake-up timer, a keyboard device, a keypad device, a button, a key, a touch-screen, a touch-panel, a joystick device, a joy-pad device, a mouse device, a pointing device, a touch-pad device, a pressure sensitive input device, another processor, or an input generated by a software program.

3. The portable remote locator device of claim 1, the input device comprising an audio input processor that is arranged to process sound as the user input.

4. The portable remote locator device of claim 3, the audio input processor comprising either an analog to digital-converter (ADC) circuit or a coder-decoder (CODEC) circuit.

5. The portable remote locator device of claim 3, the audio input processor comprising a voice input means.

6. The portable remote locator device of claim 3, the indication means comprising an audio output circuit that is configured to provide an audible alert to the user, wherein the audio output circuit includes an audio output processor that is combined in function with the audio input processor.

7. The portable remote locator device of claim 1, the indication means comprising an audio output circuit that is configured to provide audible information to the user.

8. The portable remote locator device of claim 7, wherein the audio output circuit comprises either: an audio output device, an audio output processor, or a combination of the audio output device and the audio output processor.

9. The portable remote locator device of claim 7, wherein the audio output circuit comprises either a speaker device, a piezo device, or an audio output port that is accessible by the user.

10. The portable remote locator device of claim 7, wherein the audio output circuit comprising either an analog to digital-converter (ADC) circuit or a coder-decoder (CODEC) circuit.

11. The portable remote locator device of claim 7, the audio output circuit is arranged to playback sounds from either a previously recorded sound or a user recorded sound.

12. The portable remote locator device of claim 7, wherein the audio output circuit is arranged to synthesize previously selected sounds.

13. The portable remote locator device of claim 1, the indication means comprising a visual output circuit that is configured to provide visual information to the user.

14. The portable remote locator device of claim 13, wherein the visual information comprises at least one of: a graphical distance indication, an alphanumeric distance indication, a graphical direction indication, and an alphanumeric direction indication.

15. The portable remote locator device of claim 1, the visual output circuit comprising at least one of: an LED type display, an LCD type display, an active display, a passive display, a black and white display, a monochromatic display, a color display, a discrete arrangement of LEDs, a seven segment display, and a light emitting device.

16. The portable remote locator device of claim 1, wherein the visual output circuit and the input device are combined in a touch screen device.

17. The portable remote locator device of claim 1, wherein the means for determining the rotational position comprises at least one of: an analog compass sensor device, a digital compass sensor device, and an analog-to-digital converter that is arranged to work with the analog compass sensor device.

18. The portable remote locator device of claim 1, wherein the processor means comprises at least one of: a micro-processor, a micro-controller, a complex instruction set computer (CISC) processor, a reduced instruction set computer (RISC) processor, an application specific integrated circuit (ASIC), a programmable logic device (PLD), a mode control logic, a firmware, a software, a storage circuit, a memory circuit, a non-volatile memory (NVM), and a read-only memory (ROM).

19. The portable remote locator device of claim 1, wherein the processor means is further arranged to encode a message for the transponder in the structured transmission.

20. The portable remote locator device of claim 19, wherein encoded message includes an instruction for the transponder to change to a fast ping mode, where the transponder will repeatedly transmit reply messages to the portable remote locator device.

21. The portable remote locator device of claim 19, wherein encoded message includes an instruction for the transponder to change to a bookkeeping mode, where the transponder will encode information in a reply message that is transmitted to the remote locator.

22. The portable remote locator device of claim 19, wherein the encoded information in the reply message includes at least one of: an estimated battery life associated with the transponder, environmental sensor data for the transponder, an ambient temperature, an ambient pressure, biological sensor data associated with the transponder, a heart rate, a blood pressure, a receiver signal quality, and a receiver signal strength.

23. The portable remote locator device of claim 1, wherein the processor means is further arranged to:
initiate a mode change to a fast ping mode after providing notification to the user, wherein the transmitter means in the portable remote locator device is arranged to transmit at an increased rate during the fast ping mode;
activate the transmitter means during the initiation of the fast ping mode, wherein the mode change to the fast ping mode is encoded in a message that is transmitted to the transponder at a third time so that the transponder will reply at an increased rate during the fast ping mode.

24. The portable remote locator device of claim 23, wherein the processor means is further arranged to initiate a user notification via the indication means when the direction associated with the location of the transponder relative to the portable remote locator device is determined.

25. The portable remote locator device of claim 24, wherein the indication means is arranged to provide a visual indicator of the determined direction.

26. The portable remote locator device of claim 25, wherein the visual indicator comprises at least one of: a graphical distance indication, an alphanumeric distance indication, a graphical direction indication, and an alphanumeric direction indication.

27. The portable remote locator device of claim 1, wherein the processor means is further arranged to detect the timeout condition when insufficient reply messages are received at the fourth time that correlates with the expected second reply transmission.

28. The portable remote locator device of claim 24, wherein the processor means is further arranged to:
initiate a mode change to a slow ping mode after determining the direction, wherein the transmitter means in the portable remote locator device is arranged to transmit at a decreased rate during the slow ping mode;
activate the transmitter means during the initiation of the slow ping mode, wherein the mode change to the slow ping mode is encoded in a message that is transmitted to the transponder at a fifth time so that the transponder is expected to reply to the decreased rate of transmissions from the remote locator;
monitor the distance between the portable remote locator device from the means for determining the rotational position at the fourth time; and
update the visual indicator via the indication means.

29. The portable remote locator device of claim 21, wherein the portable remote locator device is arranged to activate a sleep mode when either inactive for a predetermined time interval, or when the transponder fails to reply within a designated time.

30. The portable remote locator device of claim 1, further comprising at least two antennas that are arranged for receiving reply transmissions in the fast ping mode, wherein the processor is further arranged to the received samples from each antenna is monitored, and wherein the stream of measurements includes the identified antenna associated with the received samples.

31. A transponder device that is arranged to communicate with a remote locator device such that the remote locator device can determine a relative location of an object that is tagged with the transponder, the transponder device comprising:
a time control circuit that is arranged to provide timing control signals according to an internal high frequency clock for the transponder device;
a receiver means that is arranged to capture samples when activated utilizing timing signals from the internal high frequency clock of the transponder device;
a correlator that is arranged to identify a correlation and a correlation phase in response to captured samples from the receiver means;
a transmitter means that is arranged to transmit a structured reply transmission to the remote locator when activated, wherein the structured reply transmission has a transmit cadence and frequency that is determined by a synthesized timing that is derived from the captured samples such that reply transmissions from the transmitter means has a transmit cadence and frequency that is substantially matched to an expected reply cadence and frequency based on an internal clock for the remote locator device;
a processor means that is arranged in cooperation with the time control circuit, the transmitter means, the receiver means, and the correlator means, wherein the processor means is arranged to control an operating mode associated with the transponder, wherein the operating mode corresponds to one of a slow poll sleep mode, and a fast poll sleep mode, wherein the processor means is arranged to deactivate the high frequency clock until either the receiver means or the transmitter means is activated, wherein during the sleep mode the processor means is arranged to:
periodically enable the receiver means to capture samples during a first capture interval according to a first period that repeats after a long time interval;
evaluate the captured samples acquired during the first capture interval, identify a first authentication method when the captured samples from the first capture interval correlate to a validly coded message from the remote locator;
transmit a first reply message to the remote locator with the transmitter when the first authenticated message is identified; and
change the operating mode to the fast poll sleep mode when the first authenticated message is identified unless the first authenticated message includes a command from the remote locator to select a different mode from the fast poll sleep mode; and
wherein during the fast poll sleep mode the processor means is arranged to:
periodically enable the receiver means to capture samples during a second capture interval according to a second period that repeats after a short time interval;
evaluate the captured samples from the output of the receiver during the second capture interval;
identify a second authenticated message when the captured samples from the second capture interval correlate to another validly coded second message from the remote locator;
transmit a second reply message to the remote locator when the second authenticated message is identified, and change the operating mode to the slow poll sleep mode when a timeout interval expires without identifying the second authenticated message.

32. The transponder device of claim 31, wherein the processor means comprises at least one of: a micro-processor, a micro-controller, a complex instruction set computer (CISC) processor, a reduced instruction set computer (RISC) processor, an application specific integrated circuit (ASIC), a programmable logic device (PLD), a mode control logic, a firmware, a software, a storage circuit, a memory circuit, a non-volatile memory (NVM), and a read-only memory (ROM).

33. The transponder device of claim 31, wherein the processor means is further arranged to decode a message from the remote locator from the captured samples.

34. The transponder device of claim 33, wherein the decoded message includes an instruction to change the operating mode to one of the slow poll sleep mode and the fast poll sleep mode.

35. The transponder device of claim 33, wherein the decoded message includes an instruction for the transponder to change to a bookkeeping mode.

36. The transponder device of claim 33, wherein the processor is arranged to encode data associated with the bookkeeping mode for transmission to the remote locator.

37. The transponder device of claim 35, wherein the bookkeeping mode corresponds to a monitoring operation associated with at least one of: an estimated battery life associated with the transponder, environmental sensor data for the transponder, an ambient temperature, an ambient pressure, biological sensor data associated with the transponder, a heart rate, a blood pressure, a receiver signal quality, and a receiver signal strength.

38. The transponder device of claim 31, wherein the processor is further arranged to change the operating mode to a high-frequency clock mode when the second authenticated message is identified unless the second authenticated message includes a command from the remote locator to select a different mode from the high-frequency clock mode.

39. The transponder device of claim 38, wherein the processor is further arranged to, during the high frequency clock mode, periodically enable the receiver means to capture samples during a third capture interval according to a third period that is precisely aligned in time with an expected time of arrival for transmissions from the remote locator, wherein the third period repeats after a very short time interval, evaluate captured samples from the output of the receiver during the third capture interval, identify a third authenticated message when the captured samples from the third period are identified as a validly coded third message from the remote locator, transmit a third reply message to the remote locator when the third authenticated message is identified.

40. The transponder of claim 39, wherein the processor is further arranged to change the operating mode to a slow poll sleep mode when a second timeout interval expires without identifying the third authenticated message.

41. A method for a portable remote locator device that is operated by a user to determine a relative location of an object that is tagged with a transponder device, the method comprising:
  activating the portable remote locator device in an initial acquisition mode in response to user initiated input;
  during the initial acquisition mode:
    transmitting a first structured transmission to the transponder device over a first time interval when the initial acquisition mode is active, wherein the first structured transmission is coded with an identifier recognized by the transponder;
    capturing samples with a receiver during the first time interval;
    detecting a first reply from the transponder device at a second time when the captured samples correlate with an expected first reply transmission from the remote locator; and
    changing the operating mode of the portable remote locator device from the initial acquisition mode to a spin-around mode when the first reply is detected;
  notifying the user to rotate the portable remote locator device when the operating mode changes from the initial acquisition mode to the spin-around mode;
  collecting a stream of measurements over multiple communications with the transponder during the spin-around mode by repeatedly:
    transmitting a second structured transmission to the transponder over a third time interval, wherein the first structured transmission is coded with an identifier recognized by the transponder;
    capturing samples with the receiver and corresponding directional readings from an electronic compass during a fourth time interval;
    detecting a second reply from the transponder when the captured samples from the fourth time interval correlate to an expected second reply transmission from the transponder device, and capturing the correlation data;
    determining whether a complete rotation has been successfully completed by the user based on the captured readings from the electronic compass;
    terminating the spin-around mode when either a complete rotation of the portable remote locator device is successfully completed; and
  determining a directional heading from the portable remote locator device to the transponder by evaluating the stream of measurements after the spin-around mode is terminated; and
  updating a user direction indicator on the portable remote locator device when the valid directional reading is identified.

42. A method for a transponder to communicate with a remote locator such that a directional heading from the remote locator to the transponder can be determined, the method comprising:
  activating a high frequency clock in the transponder when the transponder is operated in either a slow poll mode, or a fast poll mode;
  deactivated the high frequency clock in the transponder when the transponder is operated in a sleep interval;
  periodically activating the sleep interval for the transponder after a first time interval expires when the slow poll mode is active, wherein a wake-up time for the sleep interval is sufficiently long such that the transponder consumes minimal power during the low-power sleep mode;
  periodically activating the sleep interval for the transponder after a second time interval expires when the fast poll mode is active, wherein a wake-up time for the sleep interval is shorter for the fast poll mode than for the slow poll mode;
  capturing samples with a receiver in the transponder when the high frequency clock is active;
  correlating captured samples with an expected transmission from the remote locator when the high frequency clock is active;
  synthesizing a timing and cadence for transmissions in the transponder with timing information acquired from the captured samples when a valid correlation is identified;
  changing from the slow poll mode to the fast poll mode when a fast mode command is extracted from the captured samples during the slow poll mode;
  changing from the fast poll mode to the slow poll mode when a slow poll mode command is extracted from the captured samples during the fast poll mode, or when the fast poll mode is active for an extended time period without receiving a slow poll mode command; and
  transmitting a reply message to the remote locator using the synthesized timing and cadence when the captured samples correlate with the expected transmission from the remote locator.

* * * * *